(12) United States Patent
Kim et al.

(10) Patent No.: US 10,030,895 B2
(45) Date of Patent: Jul. 24, 2018

(54) MAGNETIC REGENERATOR UNIT AND MAGNETIC COOLING SYSTEM WITH THE SAME

(71) Applicants: Samsung Electronics Co., Ltd., Suwon-si (KR); Research & Business Foundation Sungkyunkwan University, Suwon-si (KR)

(72) Inventors: Jin Han Kim, Suwon-si (KR); Il Han Park, Suwon-si (KR); Keon Kuk, Yongin-si (KR); Woo Hyek Choi, Yongin-si (KR)

(73) Assignees: SAMSUNG ELECTRONICS CO., LTD., Suwon-si (KR); RESEARCH & BUSINESS FOUNDATION SUNGKYUNKWAN UNIVERSTIY, Suwon-si (KR)

( * ) Notice: Subject to any disclaimer, the term of this patent is extended or adjusted under 35 U.S.C. 154(b) by 249 days.

(21) Appl. No.: 14/642,186

(22) Filed: Mar. 9, 2015

(65) Prior Publication Data

US 2015/0267943 A1     Sep. 24, 2015

(30) Foreign Application Priority Data

Mar. 18, 2014  (KR) .................. 10-2014-0031629

(51) Int. Cl.
*F25B 21/00* (2006.01)
*H01F 1/01* (2006.01)

(52) U.S. Cl.
CPC ...... *F25B 21/00* (2013.01); *F25B 2321/0022* (2013.01); *H01F 1/012* (2013.01); *Y02B 30/66* (2013.01)

(58) Field of Classification Search
CPC ...... F25B 21/00; F25B 2321/00; H01F 1/012; Y02B 30/66
See application file for complete search history.

(56) References Cited

U.S. PATENT DOCUMENTS

2010/0107654 A1   5/2010   Rowe et al.
2011/0061399 A1   3/2011   Chang et al.
(Continued)

FOREIGN PATENT DOCUMENTS

EP   2784411       10/2014
JP   2007-147209   6/2007
(Continued)

OTHER PUBLICATIONS

Extended European Search Report dated Jan. 20, 2016 in European Patent Application No. 15159713.5.
(Continued)

*Primary Examiner* — Elizabeth Martin
(74) *Attorney, Agent, or Firm* — Staas & Halsey LLP

(57) ABSTRACT

A terminal may be provided with a magnetic regenerator unit using a magnetocaloric effect of magnetocaloric materials and a magnetic cooling system having the same. By a circular magnetic regenerator structure capable of evenly flowing heat transfer fluid and magnetic field and the flow of the heat transfer fluid being changed in the same way, and a magnetic band having a relative permeability, similar to a relative permeability of the magnetic regenerator, high efficiency of a flux generator may be obtained while reducing torque of a rotator. Power consumption for driving may be reduced due to the reduction of the cogging torque, and the magnetic band may be manufactured at a low cost by using inexpensive iron powder.

17 Claims, 25 Drawing Sheets

(56) References Cited

U.S. PATENT DOCUMENTS

2011/0192833 A1    8/2011  Muller et al.
2011/0239662 A1*  10/2011  Bahl ...................... F25B 21/00
                                                                    62/3.1
2014/0305139 A1   10/2014  Takahashi et al.

FOREIGN PATENT DOCUMENTS

| JP | 2008-51409   | 3/2008 |
| JP | 2013-50284   | 3/2013 |
| JP | 2013-108728  | 6/2013 |
| WO | 2013/077225  | 5/2013 |

OTHER PUBLICATIONS

Canadian Office Action dated Jun. 6, 2017, in corresponding Canadian Patent Application No. 2,941,237.
Australian Notice of Acceptance for Patent Application dated Jul. 13, 2017, in corresponding Australian Patent Application No. 2015232241.
Australian Office Action dated Apr. 13, 2017, in corresponding Australian Patent Application No. 2015232241.
Korean Office Action dated Apr. 19, 2018, in corresponding Korean Patent Application No. 10-2014-0031629.
Canadian Notice of Allowance dated Apr. 3, 3018, in corresponding Canadian Patent Application No. 2,941,237.

* cited by examiner

| | DENSITY OF IRON POWDER | 1.81 | 1.25 | 1.35 | 1.46 | 1.82 | 3.00 | 4.00 |
|---|---|---|---|---|---|---|---|---|
| | | | | APPLING TO MAGNETIC BAND | | | | |
| RELATIVE PERMEABILITY | | | | | | | | |
| MAXIMUM TORQUE | | 109.4 | 41.2 | 21.1 | 15.0 | 50.9 | 103.2 | 111.8 |

FIG. 14

| | RELATIVE PERMEABILITY[$\mu_r$] | DENSITY OF IRON POWDER[$g/cm^3$] |
|---|---|---|
| | 6.90 | 3.23 |
| | 3.00 | 1.69 |
| | 1.81 | 1.07 |
| | 1.46 | 0.69 |
| | 1.25 | 0.50 |

MAGNETIC REGENERATOR UNIT AND MAGNETIC COOLING SYSTEM WITH THE SAME

CROSS-REFERENCE TO RELATED APPLICATIONS

This application claims the priority benefit of Korean Patent Application No. 2014-0031629, filed on Mar. 18, 2014 in the Korean Intellectual Property Office, the disclosure of which is incorporated herein by reference.

BACKGROUND

1. Field

Embodiments of the present disclosure relate to a magnetic regenerator unit using a magnetocaloric effect of magnetocaloric materials and a magnetic cooling system having the same.

2. Description of the Related Art

A magnetic cooling system is configured to use a feature of magnetocaloric materials, which generates heat when magnetized by a magnetic field, and absorbs heat when demagnetized by an outer magnetic field. In addition, the magnetic cooling system may replace conventional cooling apparatuses, which use an air compression cycle.

Generally, a magnetic cooling system includes a magnetic regenerator formed of magnetocaloric materials, a flux generator for obtaining a magnetocaloric effect from the magnetocaloric materials, a fluid supply device for forming a thermal gradient from the magnetocaloric effect, a heat exchanger for absorbing heat from the outside or for emitting heat to the outside by using the thermal gradient, and the like.

In the magnetic cooling system, the flux generator including an external stator and an internal rotator is provided with magnetocaloric materials evenly arranged on an inner surface of the stator to reduce torque of the rotator so as to obtain high efficiency. When the magnetocaloric material is evenly arranged on the inner surface of the stator, the flux generator, which is formed in a shape of an oval, is divided into a magnetization area into a demagnetization area.

In the oval-shaped flux generator, an area where the change of the magnetic field is increased, and an area where the change of the magnetic field is decreased appear by rotation of permanent magnets so the flow of heat transfer fluid may not correspond to the change of the magnetic field. When the change of the magnetic field and the flow of the heat transfer fluid are proportionally changed, the flux generator may obtain a maximum cooling capacity. However, in the oval shaped flux generator, the heat transfer fluid may not be proportionally changed and may not evenly flow so that the maximum cooling capacity may not be obtained when considering the amount of material.

SUMMARY

In an aspect of one or more embodiments, there is provided a magnetic regenerator unit capable of obtaining maximum cooling capacity of a magnetic regenerator by a circular magnetic regenerator structure allowing heat transfer fluid to flow evenly and achieving high efficiency of the magnetic regenerator while reducing torque of a rotator by a magnetic band having a relative permeability similar to that of the magnetic regenerator, and a magnetic cooling system having the same.

In an aspect of one or more embodiments, there is provided a magnetic regenerator unit which includes a magnetic regenerator formed of magnetocaloric materials, and a magnetic band having a relative permeability similar to that of the magnetic regenerator and disposed on one side of the magnetic regenerator.

The magnetic regenerator may be provided with a plurality thereof being disposed to be spaced apart from each other, and the magnetic band may be provided with a plurality thereof being disposed to be spaced apart from each other between the plurality of the magnetic regenerators.

The magnetic regenerator and the magnetic band may be alternately disposed with each other in a circumferential direction.

The magnetic band may be formed in a shape of a curved panel having curvature identical to the curvature of a cylindrical surface of the magnetic band, and may be disposed between the magnetic regenerators.

The magnetic band may be formed of a compound material of magnetic material having a high relative permeability, and a non-magnetic material.

The magnetic material may include an iron powder and the non-magnetic material may include at least one of air, plastic, polymer and iron oxide.

A relative permeability of the magnetic band may be changed by mixing the magnetic material and the non-magnetic material after adjusting a volume ratio of the magnetic material and the non-magnetic material or adjusting a density ratio of a magnetic material per unit magnetic area.

The relative permeability of the magnetic band may have a value in the range of 20% to 150% of a relative permeability of magnetocaloric material.

The relative permeability of the magnetic band may have a value in the range of the relative permeability of the magnetocaloric material changed by the temperature change.

The magnetic band may include a portion having one or more different relative permeabilities in a longitudinal direction of forming the temperature gradient of the magnetic regenerator.

The magnetic band may be formed in the same shape as the magnetic regenerator and disposed on one side of the magnetic regenerator.

The magnetic band may be formed in an elliptical shape different than the magnetic regenerator and disposed on one side of the magnetic regenerator.

The magnetic band may include an accommodation groove in which the magnetic regenerator is accommodated.

The magnetic band may be formed in a shape of a ring.

A thickness of the magnetic band may differ from that of the magnetic regenerator.

The magnetic regenerator unit may further include a container in which the magnetic regenerator and the magnetic band are inserted and to be fixed, and the container may include a magnetic regenerator accommodation groove in which the magnetic regenerator is inserted, and a magnetic band accommodation groove in which the magnetic band is inserted.

The container may be formed in a shape of a ring, wherein the magnetic regenerator accommodation groove and the magnetic band accommodation groove may be alternately arranged in a circumferential direction.

In an aspect of one or more embodiments, there is provided a magnetic cooling system which includes a flux generator generating a magnetic field to obtain magnetocaloric effect from magnetocaloric materials, a magnetic regenerator unit disposed between magnetic fields generated by the flux generator, a fluid supply apparatus forming a temperature gradient from the magnetocaloric effect, and a heat exchanger exchanging heat with the outside by using the temperature gradient, wherein the magnetic regenerator unit includes a magnetic regenerator formed of magnetocaloric materials, and a magnetic band having a relative permeability similar to that of the magnetic regenerator and disposed on one side of the magnetic regenerator.

The flux generator may include a yoke as a stator and a permanent magnet as a rotator.

The yoke may be formed in a shape of a hollow cylinder and made of silicon steel.

The magnetic regenerator and the magnetic band may be arranged between the yoke and the permanent magnet in a circumferential direction.

The magnetic cooling system may further include a driving apparatus configured to rotate a rotator provided with the permanent magnet, wherein the driving apparatus may include a motor installed on the outside of the magnetic cooling system.

The magnetic cooling system may further include a driving apparatus configured to rotate a rotator provided with the permanent magnet, wherein the driving apparatus may include teeth and a coil formed on the stator yoke.

The magnetic regenerator unit may include a gap between a magnetic regenerator and a magnetic band.

A shape of the magnetic regenerator may be identical to a shape of the magnetic band to reduce cogging torque.

The magnetic band may be formed in a shape of an oval.

The magnetic regenerator may be formed in a shape of an oval.

The magnetic band may be disposed inside a magnetic regenerator without a gap between the magnetic band and the magnetic regenerator.

BRIEF DESCRIPTION OF THE DRAWINGS

These and/or other aspects of the disclosure will become apparent and more readily appreciated from the following description of embodiments, taken in conjunction with the accompanying drawings of which:

FIG. 11 is a view illustrating the change of torque of the magnetic regenerator unit in accordance with an embodiment;

FIG. 14 is a table of the density of an iron illustrated in FIG. 13;

DETAILED DESCRIPTION

Reference will now be made in detail to embodiments of the present disclosure, examples of which are illustrated in the accompanying drawings.

Figure 1A:
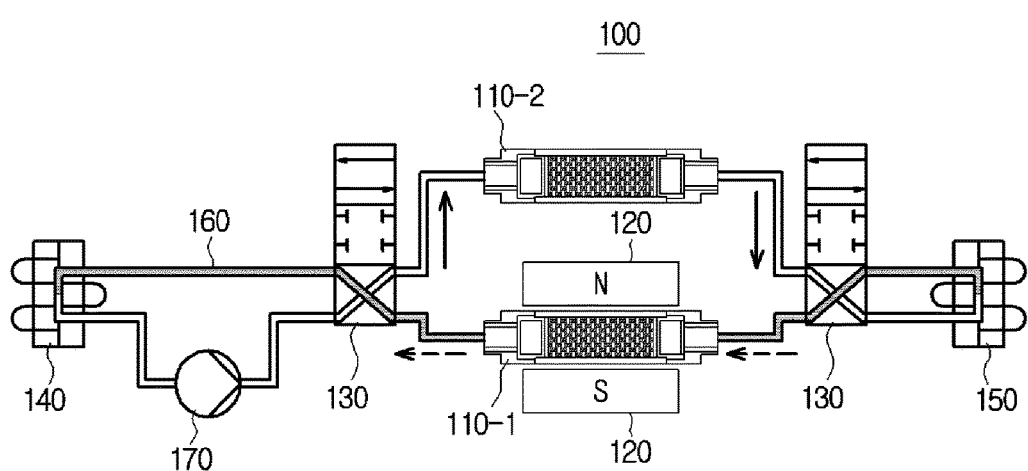
FIGS. 1A and 1B are views illustrating a schematic configuration of the flow of the heat transfer fluid in a general magnetic cooling system.
Figure 1B:
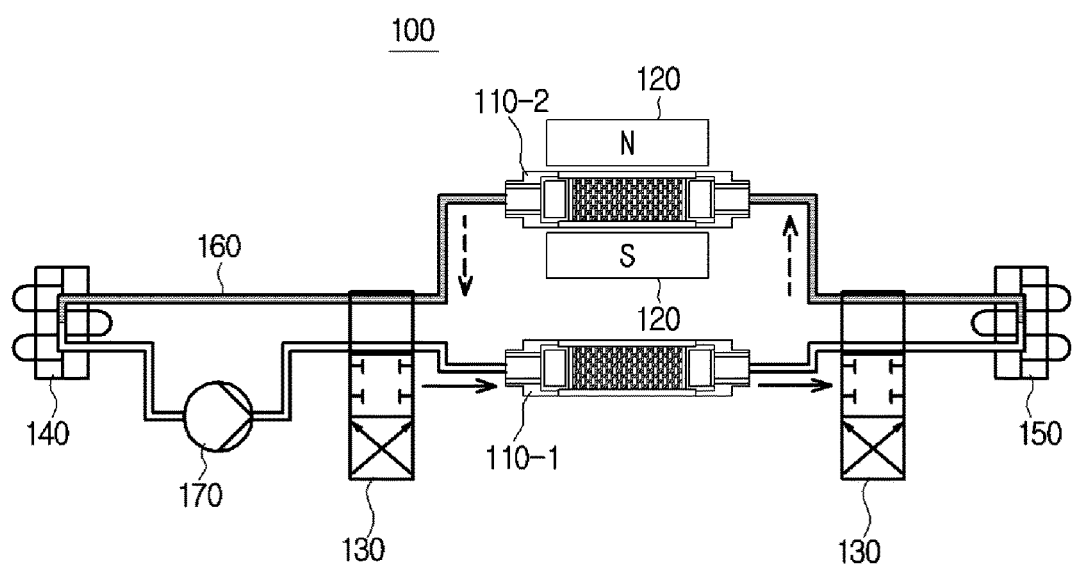

FIGS. 1A and 1B are views illustrating a schematic configuration of the flow of the heat transfer fluid in a conventional general magnetic cooling system.

As illustrated in FIGS. 1A and 1B, a general magnetic cooling system 100 includes a pair of magnetic regenerators 110 formed of magnetocaloric materials, a permanent magnet 120 for applying or removing magnetic field to or from the magnetic regenerator 110, a fluid supply apparatus 130 for supplying a heat transfer fluid to the inside of the magnetic regenerator 110, a hot side and a cold side heat exchanger 140 and 150 for allowing the heat transfer fluid passed through the magnetic regenerator 110 to absorb heat from the outside or to discharge heat to the outside, a feed pipe 160 for guiding the flow of the heat transfer fluid, and a pump 170 disposed on the feed pipe to circulate the heat transfer fluid.

The pair of the magnetic regenerators 110 includes a first magnetic regenerator 110-1, and a second magnetic regenerator 110-2.

The first magnetic regenerator 110-1, and the second magnetic regenerator 110-2 may adapt Active Magnetic Regenerator (AMR) filled with heat exchange materials passing the flow of the heat transfer fluid of the first magnetic regenerator 110-1, and the second magnetic regenerator 110-2.

The permanent magnets 120 are installed at both sides of the first magnetic regenerator 110-1, and the second magnetic regenerator 110-2 to apply or remove a magnetic field to or from the first magnetic regenerator 110-1, and the second magnetic regenerator 110-2.

The permanent magnet 120 includes at least a pair of a north pole and south pole, and is movable in order to apply or remove magnetic field to or from the first magnetic regenerator 110-1 and the second magnetic regenerator 110-2. The first magnetic regenerator 110-1 and the second magnetic regenerator 110-2 are maintained in a stationary state.

When the permanent magnet 120 moves to apply or remove magnetic field to or from the first magnetic regenerator 110-1 and the second magnetic regenerator 110-2 by alternating motions and rotary motions, the first magnetic regenerator 110-1 and the second magnetic regenerator 110-2 may alternatively enter and leave the magnetic field generated between the north pole and the south pole of the permanent magnet 120. The first magnetic regenerator 110-1 and a second magnetic regenerator 110-2 are magnetized while in the magnetic field, and the first magnetic regenerator 110-1 and the second magnetic regenerator 110-2 are demagnetized when/upon leaving the magnetic field. When the first magnetic regenerator 110-1 is magnetized by entering the magnetic field, the second magnetic regenerator 110-2 is demagnetized by leaving the magnetic field. Further, the second magnetic regenerator 110-2 is demagnetized by leaving the magnetic field, and the first magnetic regenerator 110-1 is magnetized by entering the magnetic field.

Alternatively, when the permanent magnet 120 is not moved, the first magnetic regenerator 110-1 and the second magnetic regenerator 110-2 may be allowed to enter and leave the magnetic field alternatively by alternating motions and rotary motions of the first magnetic regenerator 110-1 and the second magnetic regenerator 110-2. In this example, the fluid supply apparatus 130 and the heat exchangers 140 and 150 may be moved together.

The fluid supply apparatus 130 changes a moving direction of the heat transfer fluid into two directions (a solid line and a dotted line) to supply the heat transfer fluid to the inside of the first magnetic regenerator 110-1 and the second magnetic regenerator 110-2.

The fluid supply apparatus 130 allows the feed pipe 160 to cross in directions of the solid line and the dotted line, as illustrated in FIGS. 1A and 1B, when the first magnetic regenerator 110-1 and the second magnetic regenerator 110-2 are magnetized and demagnetized, respectively.

Accordingly, when the first generator 110-1 is magnetized and the second generator 110-2 is demagnetized, a hot side flow path is formed through the magnetized first generator 110-1 to allow fluid to flow, and a cold side flow path is formed through the demagnetized second generator 110-2 to allow fluid to flow.

Alternatively, in a case when the first generator 110-1 is demagnetized, and the second generator 110-2 is magnetized, a cold side flow path is formed through the demagnetized first generator 110-1 to allow fluid to flow and a hot side flow path is formed through the magnetized second generator 110-2 to allow fluid to flow.

According to a polarity of the permanent magnet 120, the magnetization and the demagnetization of the first magnetic regenerator 110-1 and the second magnetic regenerator 110-2 are continuously changed, and the fluid supply apparatus 130 supplies the heat transfer fluid to the inside of the first magnetic regenerator 110-1 and the second magnetic regenerator 110-2 at a time of the magnetization and the demagnetization. As the cycle is repeated, a temperature difference between the hot side and the cold side is increased. Thus, heat exchange occurs at the hot side heat exchanger 140 and the cold side heat exchanger 150 so that cooling performance of the magnetic cooling system is realized.

Therefore, the heat radiation effect and the heat absorption effect of the magnetization and the demagnetization of the first magnetic regenerator 110-1 and the second magnetic regenerator 110-2 may apply to the heating and the cooling. The magnetic cooling system 100 may obtain a high temperature and a low temperature by the heat radiation effect and the heat absorption effect of the first magnetic regenerator 110-1 and the second magnetic regenerator 110-2.

The hot side heat exchanger 140 is provided on the hot side so that the heat transfer fluid radiates thermal energy to the hot side, and the cold side heat exchanger 150 is provided on the cold side so that the heat transfer fluid absorbs thermal energy from the cold side. The hot side heat exchanger 140 and the cold side heat exchanger 150 may include heat exchanger fin (not shown) to improve the heat exchange efficiency.

The feed pipe 160 connects the first magnetic regenerator 110-1 and the second magnetic regenerator 110-2 to the hot side heat exchanger 140 and the cold side heat exchanger 150, respectively to allow the heat transfer fluid to be circulated by transferring the heat transfer fluid.

The heat transfer fluid may be a fluid to flow through the feed pipe 160. Water, alcohol, antifreeze, such as ethylene glycol, helium gas, and the like may be used for the heat transfer fluid and further mixed fluid, which is mixed water, alcohol, antifreeze, such as ethylene glycol, helium gas, and the like, may also be used. The heat transfer fluid absorbs thermal energy from the cold side heat exchanger 150, transfers thermal energy to the first magnetic regenerator 110-1 and the second magnetic regenerator 110-2, absorbs thermal energy from the first magnetic regenerator 110-1 and the second magnetic regenerator 110-2, and transfers thermal energy to the hot side heat exchanger 140.

The pump 170 allows the heat transfer fluid to circulate through the feed pipe 160. In FIGS. 1A and 2B, the pump 170 allows the heat transfer fluid to circulate through the feed pipe 160 counterclockwise, but is not limited thereto. The pump 170 may allow the heat transfer fluid to circulate through the feed pipe 160 clockwise FIG. 2 is a view illustrating a cooling cycle in a general magnetic cooling system includes states (points or positions) (a) through (d) in the cooling cycle.

Figure 2:
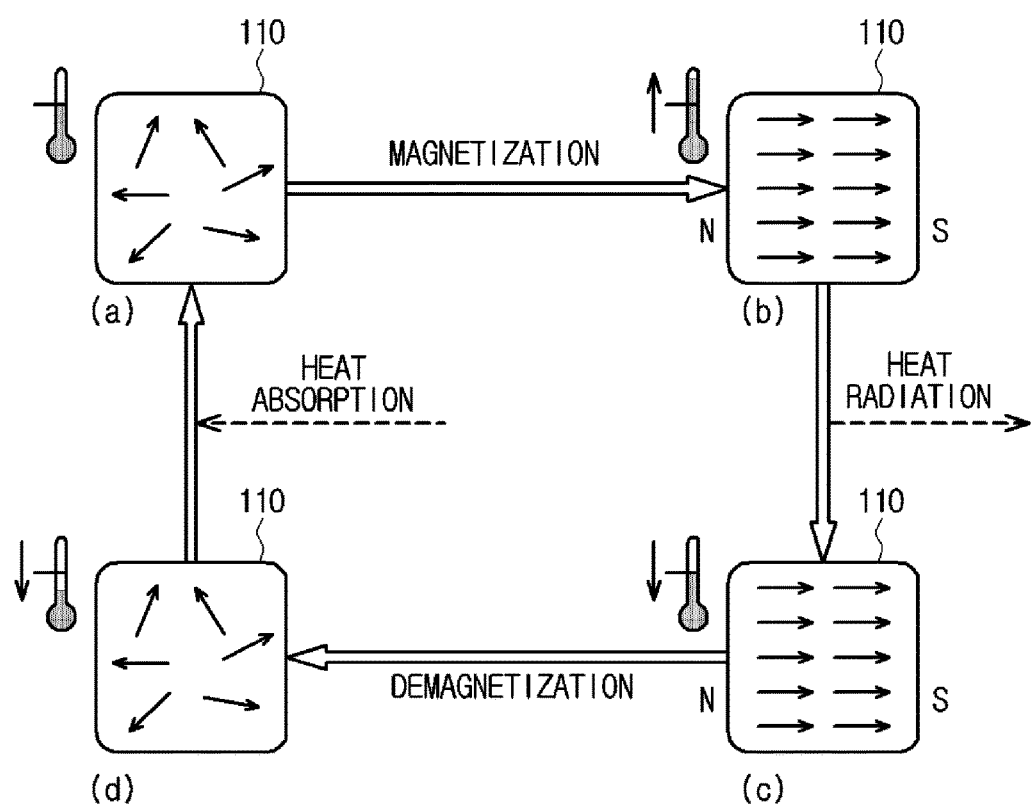
FIG. 2 is a view illustrating a cooling cycle in the general magnetic cooling system including states (points or positions) (a) through (d) in the cycle.

In (a) of FIG. 2, as for a magnetic regenerator 110 exchanging heat with heat exchange fluid in a state of magnetic field not being generated, the magnetic regenerator 110 is maintained to be demagnetized. While the magnetic regenerator 110 is demagnetized, magnetic dipoles inside the magnetic regenerator 110 are irregularly arranged as illustrated in (a) of FIG. 2.

When the magnetic regenerator 110 enters the magnetic field, the magnetic regenerator 110 is magnetized by the magnetic field. The magnetic dipoles inside the magnetic regenerator 110 are regularly arranged in a direction of the magnetic field, as illustrated in (b) of FIG. 2. The magnetic regenerator 110 emits thermal energy, as an amount of the difference between internal energy when the magnetic regenerator 110 is demagnetized, and internal energy when the magnetic regenerator 110 is magnetized. Accordingly, a temperature of the magnetic regenerator 110 is increased, as illustrated in (b) of FIG. 2.

That is, while the magnetic regenerator 110 is magnetized, the magnetic regenerator 110 makes contact with the heat transfer fluid, and transfers thermal energy to the heat transfer fluid, thereby increasing a temperature of the heat transfer fluid, as illustrated in (c) of FIG. 2.

When the magnetic regenerator 110 escapes from the magnetic field, the magnetic regenerator 110 is demagnetized. The magnetic dipole inside the magnetic regenerator 110 become irregularly arranged again, as illustrated in (d) of FIG. 2. The magnetic regenerator 110 absorbs thermal energy, as an amount of the difference between (1) internal energy when the magnetic regenerator 110 is demagnetized and (2) internal energy when the magnetic regenerator 110 is magnetized. Accordingly, a temperature of the magnetic regenerator 110 is decreased, as illustrated in (d) of FIG. 2.

That is, while the magnetic regenerator 110 is demagnetized, the magnetic regenerator 110 makes contact with the heat transfer fluid, and absorbs thermal energy from the heat transfer fluid, thereby decreasing a temperature of the heat transfer fluid, as illustrated in (a) of FIG. 2.

As mentioned above, while being magnetized by the magnetic field, the magnetic regenerator 110 transfers thermal energy to the heat transfer fluid, and while being demagnetized by the magnetic field, the magnetic regenerator 110 absorbs thermal energy from the heat transfer fluid.

Figure 3:
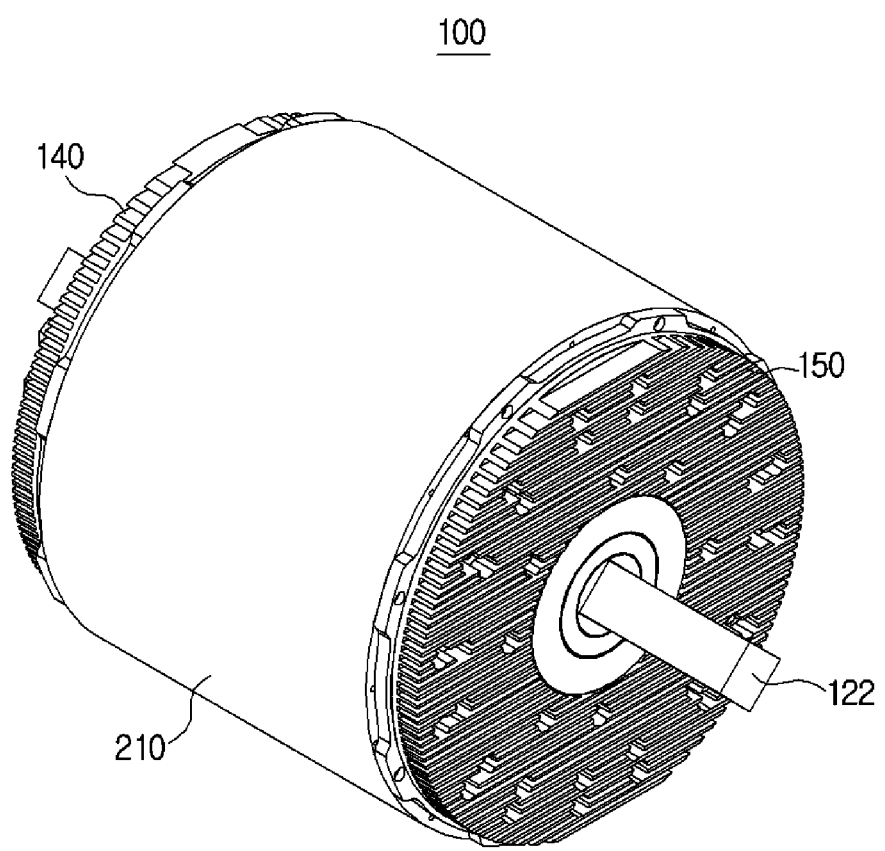
FIG. 3 is a perspective view illustrating an external appearance of a magnetic cooling system in accordance with an embodiment.
Figure 4:
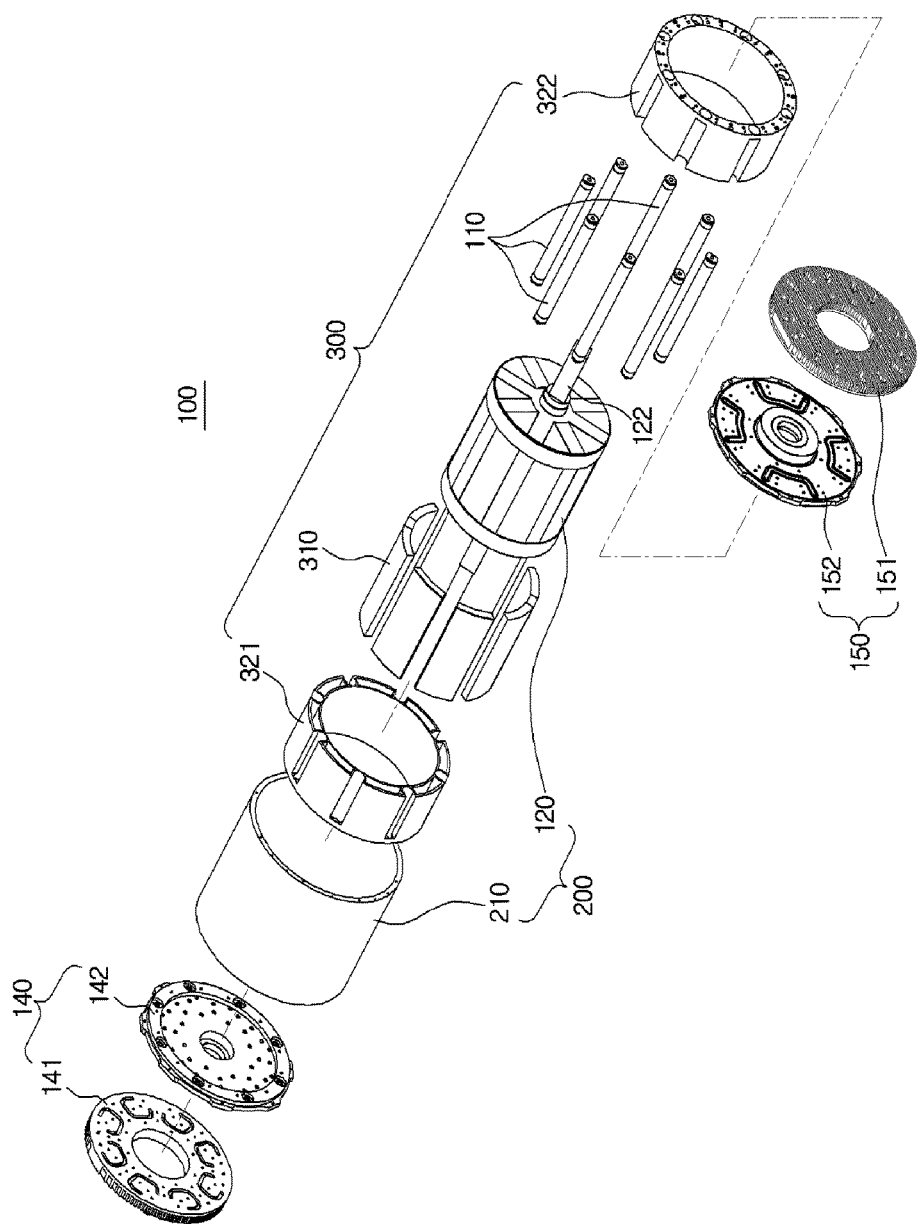
FIG. 4 is an exploded perspective view illustrating a rotary magnetic cooling system in accordance with an embodiment.

FIG. 3 is a perspective view illustrating an external appearance of a magnetic cooling system in accordance with an embodiment of the present disclosure, and FIG. 4 is an exploded perspective view illustrating a rotary type-magnetic cooling system in accordance with an embodiment of the present disclosure.

In accordance with an embodiment of the present disclosure, a magnetic cooling system 100 in which a 4-pole magnet including four magnetic areas and four non-magnetic areas, and eight magnetic regenerators 110 are disposed, will be described as an example.

In FIGS. 3 and 4, in accordance with an embodiment of the present disclosure, a magnetic cooling system 100 includes a circular flux generator 200 divided in to an inside portion and an outside portion due to the feature of the rotation, and a circular magnetic regenerator unit 300 in the magnetic field generated by the flux generator 200.

The flux generator 200 includes a yoke 210 as a stator and a permanent magnet 120 as a rotator.

The yoke 210 is formed in a shape of a hollow cylinder and made of silicon steel.

The permanent magnet 120 is formed in a cylinder and includes 4-pole magnets including four magnetic areas and four non-magnetic areas.

The magnetic regenerator unit 300 includes eight magnetic regenerators 110 formed of magnetic material, eight magnetic bands 310 disposed among the eight magnetic regenerators 110, and containers 320 including containers 321 and 322 in which the eight magnetic regenerators 110 and the eight magnetic bands 310 are inserted thereto to be fixed.

The magnetic band 310 has a relative permeability ($\mu r$) similar to a relative permeability ($\mu r$) of magnetocaloric materials to reduce cogging torque, that is, a rotational torque, generated by the permanent magnet 120 and magnetocaloric materials.

The containers 320, which include containers 321 and 322, are formed in a shape of a hollow cylinder, and include a first container 321 and a second container 322, which are formed in a shape of a hollow cylinder. The first container 321 and the second container 322 are coupled to face to each other.

Heat exchangers 140 and 150 are installed at both ends of the magnetic regenerator unit 300 so that the heat transfer fluid passing through the magnetic regenerator 110 absorbs heat from the outside or emits heat to the outside.

The heat exchanger 140 and 150 include the hot side heat exchanger 140 in which the heat transfer fluid with a relative high temperature transferred from the magnetic regenerator 110 in a state of being applied to the magnetic field by the flux generator 200 is introduced or discharged and the cold side heat exchanger 150 in which the heat transfer fluid with a relative low temperature transferred from the magnetic regenerator 110 in a state of being removed from the magnetic field by the flux generator 200 is introduced or discharged.

The hot side heat exchanger 140 includes a heat exchanging member 141 provided with a heat exchanger fin and a sealing member 142 in which the feed pipe is formed and the magnetic regenerator 110 is fixed.

The cold side heat exchanger 150 includes a heat exchanging member 151 provided with a heat exchanger fin and a sealing member 152 in which the feed pipe is formed and the magnetic regenerator 110 is fixed.

The heat transfer fluid exchanges heat by circulating alternately clockwise or counter clockwise, when the permanent magnet 120 applies or removes magnetic field to or from the magnetic regenerator 110, and for effective heat exchange in the hot side heat exchanger 140 or the cold side heat exchanger 150, the heat transfer fluid passed through the magnetic regenerator 110 is needed to reach the hot side heat exchanger 140 or the cold side heat exchanger 150 within a time period corresponding to a half of a single heat exchange cycle. Therefore, the hot side heat exchanger 140 and the cold side heat exchanger 150 may be disposed within a certain distance, that is, a shortest distance, from the magnetic regenerator 110.

Reference numeral 122, which is not illustrated, is a rotating shaft that is connected to an external motor (not shown) to drive the permanent magnet 120.

In accordance with an embodiment, a configuration of a stator being installed outside, and a rotator provided with the permanent magnet 120 being installed inside is described, but is not limited thereto. For example, a configuration of a rotator provided with the permanent magnet 120 being installed outside a stator being installed inside is another example.

Figure 5:
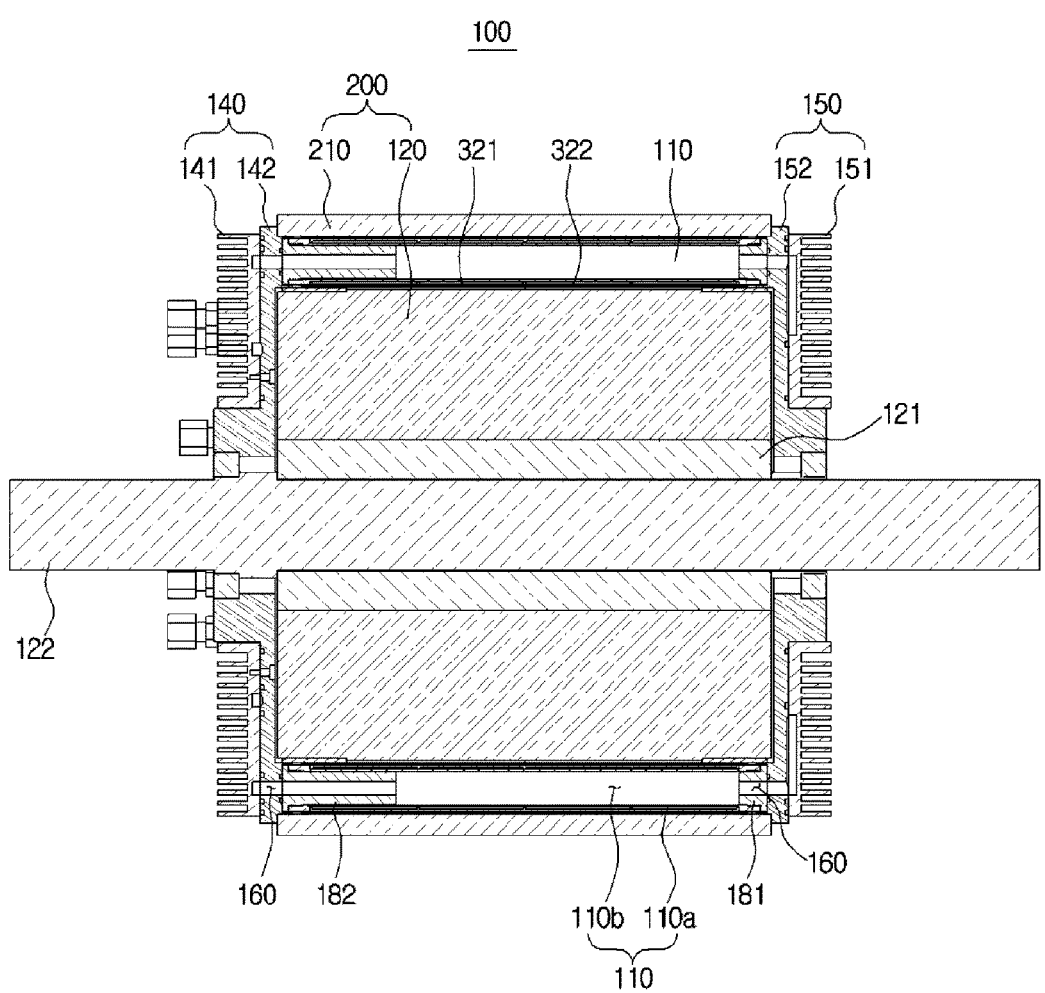
FIG. 5 is a longitudinal cross-sectional view of FIG. 3.
Figure 6:
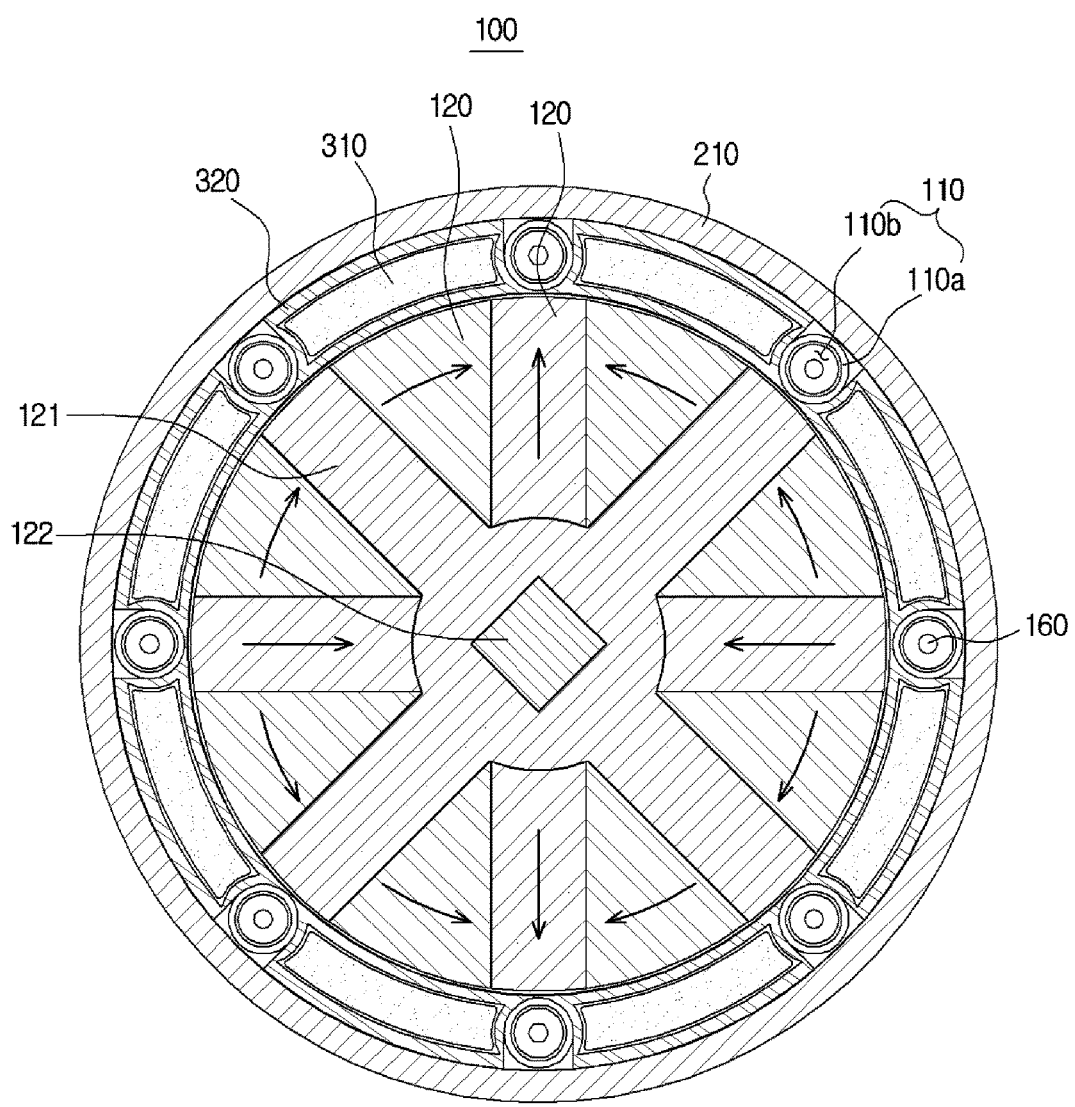
FIG. 6 is a vertical cross-sectional view of FIG. 3.

FIG. 5 is a longitudinal cross-sectional view of FIG. 3, and FIG. 6 is a vertical cross-sectional view of FIG. 3. A magnetic regenerator unit 300, as illustrated in FIG. 6, includes a gap between a magnetic regenerator 110 and a magnetic band 310.

In FIGS. 5 and 6, a magnetic cooling system 100 includes a magnetic regenerator unit 300, a flux generator 200, a hot side heat exchanger 140, a cold side heat exchanger 150, and a feed pipe 160. The magnetic regenerator unit 300 includes a plurality of magnetic regenerators 110, (for example eight magnetic regenerators), and a plurality of magnetic band 310, that is, eight magnetic band. The flux generator 200 applies or removes the magnetic field to or from the magnetic regenerator 110. At the hot side heat exchanger 140, the heat transfer fluid, which is transferred heat from the magnetic regenerator 110 in a state of being applied to the magnetic field by the flux generator, emits heat. At the cold side heat exchanger 150, the heat transfer fluid, which transfers heat to the magnetic regenerator 110 in a state of being removed from the magnetic field by the flux generator, absorbs heat. The feed pipe 160 connects the magnetic regenerator 110, the hot side heat exchanger 140, and the cold side heat exchanger 150 to each other so that the heat transfer fluid is circulated along the magnetic regenerator 110, the hot side heat exchanger 140, and the cold side heat exchanger 150.

The plurality of the magnetic regenerators 110 is disposed to be spaced apart from each other and the plurality of the magnetic bands 310 is disposed to be space apart from each other between the plurality of the magnetic regenerators 110.

The plurality of the magnetic regenerators 110 and the plurality of the magnetic bands 310 are alternately arranged in a circumferential direction thereof.

The plurality of magnetic regenerators 110, (for example eight magnetic regenerators) are disposed to pass the heat transfer fluid and includes magnetocaloric materials. The magnetic regenerator 110 includes a cylindrical shape body 110a and a penetration hole 110b formed in a longitudinal direction of the body 110a. The body 110a may be formed of materials having an insulation effect, such as plastic. The penetration hole 110b is filled with magnetocaloric materials.

At both ends of the penetration hole 110b, connectors 181 and 182 are provided to be connected to the feed pipe 160. The connectors 181 and 182 allow the magnetic regenerator 110 to be connected to the hot side heat exchanger 140 and the cold side heat exchanger 150 through the feed pipe 160 so that the heat transfer fluid passed through the magnetic regenerator 110 flows through the hot side heat exchanger 140 and the cold side heat exchanger 150. The heat transfer fluid absorbs or transfers heat generated from or to magnetocaloric materials by making contact with magnetocaloric materials while being introduced and flowing into the penetration hole 110b. In a state that the magnetic field is applied to the magnetic regenerator 110, the heat transfer fluid absorbing heat generated from magnetocaloric materials, is introduced to the hot side heat exchanger 140 to emit heat. In a state that the magnetic field is removed from the magnetic regenerator 110, the heat transfer fluid transferring heat to magnetocaloric materials, is introduced to the cold side heat exchanger 150 to absorb heat.

The flux generator 200 includes at least one permanent magnet 120 including at least a pair of a north pole and south pole. The flux generator 200 is arranged in a radial shape to apply or remove the magnetic field to or from the magnetic regenerator 110. The north pole and the south pole are disposed on the inside and the outside in a circumferential direction of the magnetic regenerator unit 300. The permanent magnet 120 is disposed on the inside of the magnetic regenerator unit 300 to be supported by a magnet support unit 121.

The hot side heat exchanger 140 and the cold side heat exchanger 150 are arranged on the circulation route of the heat transfer fluid that are opposite to each other, with respect to the magnetic regenerator unit 300. The heat radiation effect of the hot side heat exchanger 140 may be used for heating, and the heat absorption effect of the cold side heat exchanger 150 may be used for cooling.

Figure 7:
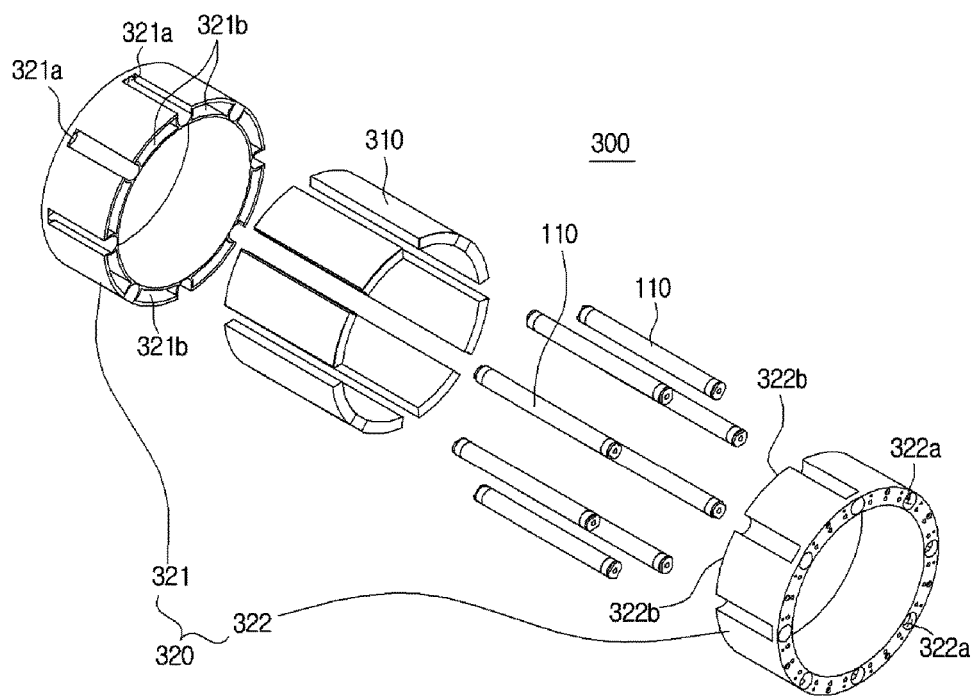
FIG. 7 is an exploded view illustrating a magnetic regenerator unit in accordance with an embodiment.

FIG. 7 is an exploded view illustrating a magnetic regenerator unit in accordance with an embodiment of the present disclosure.

In FIG. 7, the magnetic regenerator unit 300 includes eight magnetic regenerators 110, eight magnetic bands 310 which are coupled among the eight magnetic regenerators 110, and a container 320 in which the eight magnetic regenerators 110 and the eight magnetic bands 310 are fixedly installed.

In addition, the magnetic regenerator unit 300 is formed in a shape of a circle to allow the heat transfer fluid to flow smoothly so that the magnetic regenerator 110 has maximum cooling capacity.

At the inside of the magnetic regenerator 110, the penetration hole 110b is formed to be connected to the feed pipe 160, and the penetration hole 110b is filled with magnetocaloric materials. The magnetocaloric material consists of a material, which is magnetized in the magnetic field, and is demagnetized out of the magnetic field. The magnetocaloric material has magnetocaloric effect which generates heat when magnetized, and absorbs heat when demagnetized. The representative material having the magnetocaloric effect is gadolinium (Gd), which has the atomic number 64. A temperature of Gd is increased when entering the magnetic field, and is decreased when leaving the magnetic field.

An alloy of Gd and erbium (Er), and an alloy of Gd, silicon (Si), and germanium (Ge) may be adopted as the magnetocaloric material. Other than Gd, MnFe, which is a compound of manganese (Mn) and iron (Fe), LaFe, which is a compound of lanthanum (La) and iron (Fe) may be used as the magnetocaloric material. These materials have a gap with excellent relative permeability to the flow of heat transfer fluid, and are excellent in the absorption and emission of heat.

The magnetocaloric material fills the penetration hole 110b of the magnetic regenerator 110 by being processed in the form of particles or fibers. The magnetocaloric material in the form of particles or fibers have sufficient gaps so that the heat transfer fluid passes through the penetration hole 110b of the magnetic regenerator 110.

The magnetocaloric effect is that the temperature of the magnetocaloric material is increased when a magnetic field is applied to the magnetocaloric material, and the temperature of the magnetocaloric material is decreased when the magnetic field is removed from the magnetocaloric material. The magnetocaloric effect is based on the entropy law, that is, when a magnetic field is applied to the magnetocaloric material, particles of the magnetocaloric material are regularly arranged so that the temperature of the magnetocaloric material is increased, and when the magnetic field is removed from the magnetocaloric material, the arrangement of the particles of the magnetocaloric material become irregular so that the temperature of the magnetocaloric material is decreased. The magnetic regenerator 110 may obtain the cooling effect by using the temperature difference.

The magnetic band 310 is formed in a shape of a ring and has a relative permeability ($\mu r$) similar to a relative permeability ($\mu r$) of magnetocaloric materials filling the magnetic regenerator 110.

The magnetic band 310 is formed in a shape of a curved panel having a curvature identical to the curvature of a cylindrical surface of the magnetic band 310. The magnetic band 310 is disposed between the magnetic regenerators 110. A thickness of the curved panel may be the same as a diameter of the penetration hole 110b (approximately 15.8 mm), that is, identical to a thickness of the magnetocaloric material.

The magnetic band 310 may include magnetic materials having a relative permeability ($\mu r$) similar to a relative permeability ($\mu r$) of magnetocaloric materials, and may include magnetic materials having a magnetocaloric effect, as like the magnetic regenerator 110.

The magnetic band 310 is formed of a compound material of magnetic material having a high relative permeability, and a non-magnetic material. The magnetic material includes an iron powder and the non-magnetic material includes at least one of air, plastic, polymer and iron oxide.

The containers 320, which include containers 321 and 322, are formed in a shape of a hollow cylinder, and include a first container 321 and a second container 322, which are formed in a shape of a hollow cylinder. The first container 321 and the second container 322 are coupled to face to each other.

At the first and the second container 321 and 322, eight magnetic regenerator accommodation grooves 321a and 322a to which eight of the magnetic regenerators 110 are coupled, and eight magnetic band accommodation grooves 321b and 322b in which eight of the magnetic band 310 are installed are formed.

The magnetic regenerator accommodation grooves 321a and 322a are formed in a longitudinal direction of the magnetic regenerator 110 in the first and second container 321 and 322 so that the eight magnetic regenerators 110 are arranged to be radially spaced apart from each other in a circumferential direction thereof. The magnetic regenerator 110 is inserted to be coupled to the magnetic regenerator accommodation grooves 321a and 322a.

The magnetic band accommodation grooves 321b and 322b are formed in a longitudinal direction of the magnetic band 310 in the first and second container 321 and 322 so that the eight magnetic regenerators 110 are arranged to be radially spaced apart from each other in a circumferential direction thereof. The magnetic band 310 is accommodated to be coupled to the magnetic band accommodation grooves 321b and 322b.

As mentioned above, the magnetic band 310 having a relative permeability ($\mu r$) similar to a relative permeability ($\mu r$) of magnetocaloric materials is disposed on the magnetic regenerator unit 300 so that cogging torque, that is, a rotational torque, generated when the permanent magnet 120 is rotated, may be reduced.

Next, a method of changing a size of torque by adjusting the material property and a relative permeability ($\mu r$) of the magnetic band 310 will be described with reference to FIGS. 8 to 10.

Figure 8:
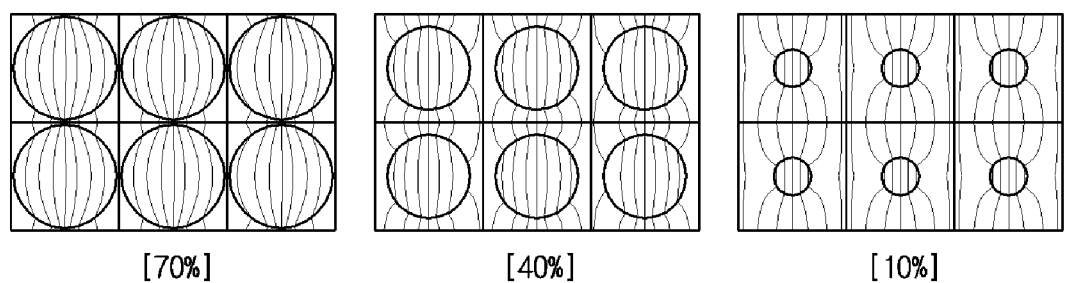
FIG. 8 is a view illustrating a flux distribution according to the volume ratio of magnetic materials of a magnetic band of the magnetic regenerator unit in accordance with an embodiment.
Figure 9:
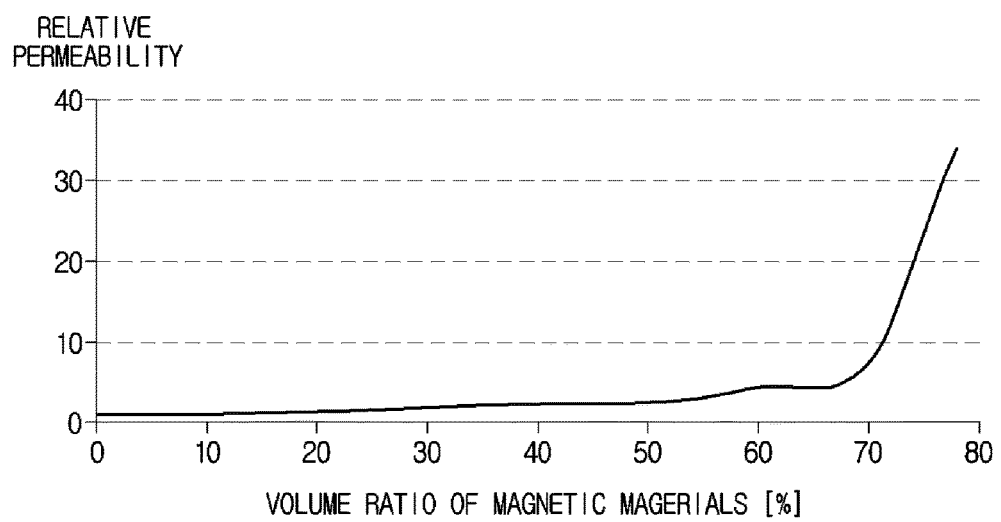
FIG. 9 is a view illustrating the change of relative permeability of the volume ratio of magnetic materials of the magnetic band of the magnetic regenerator unit in accordance with an embodiment.
Figure 10:
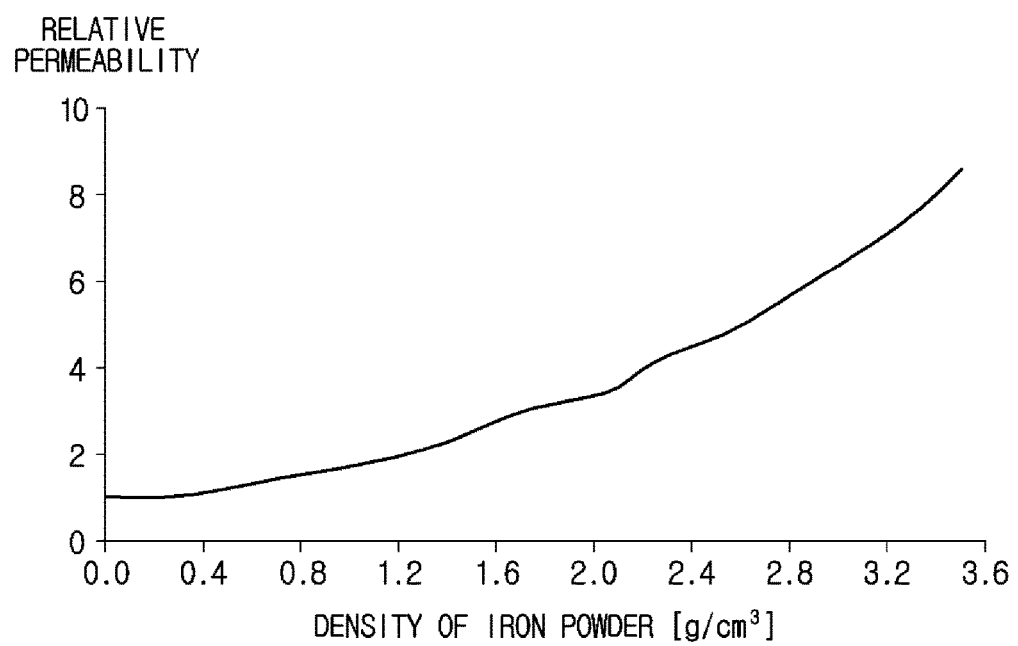
FIG. 10 is a view illustrating the change of relative permeability of the density of iron powder of the magnetic band of the magnetic regenerator unit in accordance with an embodiment.

FIG. 8 is a view illustrating a flux distribution according to the volume ratio of magnetic materials of a magnetic band of the magnetic regenerator unit in accordance with one embodiment of the present disclosure, FIG. 9 is a view illustrating the change of relative permeability of the volume ratio of magnetic materials of a magnetic band of the magnetic regenerator unit in accordance with an embodiment of the present disclosure, and FIG. 10 is a view illustrating the change of relative permeability of the density of iron powder of a magnetic band of the magnetic regenerator unit in accordance with an embodiment of the present disclosure.

When gadolinium (Gd) is used as the magnetocaloric material, the relative permeability ($\mu r$) of the magnetic band 310 is needed to be in a certain range, similar to a relative permeability ($\mu r$) of gadolinium (Gd) to reduce cogging torque. However, a relative permeability ($\mu r$) of iron is more than 1000. To produce a material having a relative permeability ($\mu r$) similar to that of gadolinium (Gd), a flux distribution according to the volume ratio is described by using iron which is readily available, as illustrated in FIG. 8. By using the flux distribution according to the volume ratio of iron, which is a magnetic material, and air, which is a non-magnetic material, the change of a relative permeability ($\mu r$) of the volume ratio of magnetic materials is obtained, as illustrated in FIG. 9. As illustrated in FIG. 10, the change of relative permeability ($\mu r$) of the density of iron powder is obtained.

By using the analysis results above, while changing the density of iron powder, a toroidal core is produced by mixing with a non-magnetic material and a relative permeability ($\mu r$) thereof is measured. Therefore, the measured relative permeability ($\mu r$) is appropriate so that the magnetic band 310 having a certain relative permeability ($\mu r$) is produced. It is possible to use non-magnetic materials, such as air, plastic, polymer, iron oxide, and the like, to produce the magnetic band 310. Other than iron, ferromagnetic materials having high relative permeability ($\mu r$) may be used.

By adjusting the volume ratio of magnetic materials and non-magnetic materials, and adjusting the density ratio of magnetic materials per unit area, the relative permeability ($\mu r$) of the magnetic band 310 is changed.

The relative permeability ($\mu r$) of the magnetic band 310 may be in a range between 20% of the relative permeability ($\mu r$) of the magnetocaloric material to 150% of the relative permeability ($\mu r$) of the magnetocaloric material.

Since the relative permeability ($\mu r$) of the magnetocaloric material may be changed according to the temperature of the magnetocaloric material, the relative permeability ($\mu r$) of the magnetic band 310 may be in a range of the relative permeability ($\mu r$) of the magnetocaloric material changed according to the change of the temperature. For example, the relative permeability ($\mu r$) of gadolinium (Gd), one of magnetocaloric materials, is changed from 1.2 to 8.8, which is a measurement obtained by experiment, according to the temperature. Therefore, with considering the temperature gradient, the relative permeability ($\mu r$) of the magnetic band 310 may be determined to be a certain value, such as 1.46, 3.0, 5.0 and the like, which is present within a range from 1.2 to 8.8.

Next, a method of changing a size of torque by adjusting the relative permeability ($\mu r$) of the magnetic band 310 will be described with reference to FIG. 11.

FIG. 11 is a view illustrating the change of torque of the magnetic regenerator unit in accordance with one embodiment of the present disclosure.

In FIG. 11, while a thickness of the magnetic band 310 is maintained to be identical to that of the magnetocaloric material, cogging torque may be reduced by changing the relative permeability ($\mu r$) of the magnetic band 310.

As illustrated in FIG. 11, the maximum cogging torque may be changed according to the change of the relative permeability ($\mu r$) of the magnetic band 310.

For example, when the relative permeability ($\mu r$) is 1.25, the maximum torque is 4.21, when the relative permeability ($\mu r$) is 1.35, the maximum torque is 21.1, when the relative permeability ($\mu r$) is 1.46, the maximum torque is 15.0, and when the relative permeability ($\mu r$) is 1.82, the maximum torque is 50.9. As mentioned above, the maximum cogging torque is changed according to the relative permeability ($\mu r$).

Next, a configuration of the magnetic band 310 according to the change of the temperature of Gd, one of magnetocaloric materials, will be described with reference to FIGS. 12 to 14.

Figure 12:
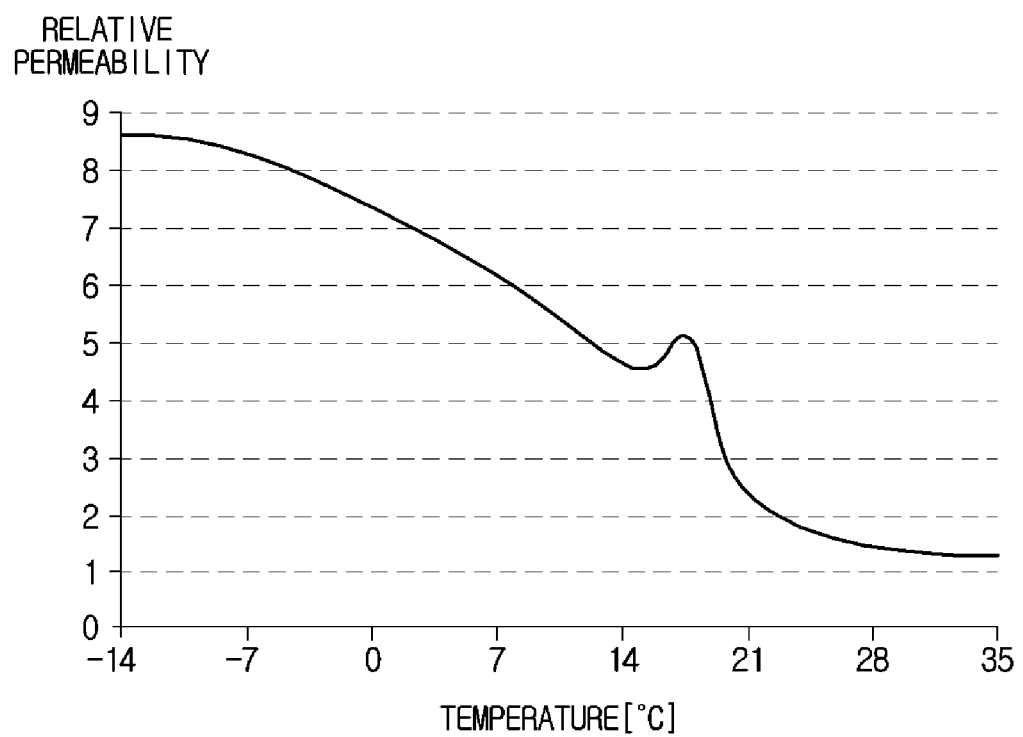
FIG. 12 is a graph illustrating the change of a relative permeability according to a temperature of magnetocaloric materials of the magnetic regenerator unit in accordance with an embodiment.
Figure 13:
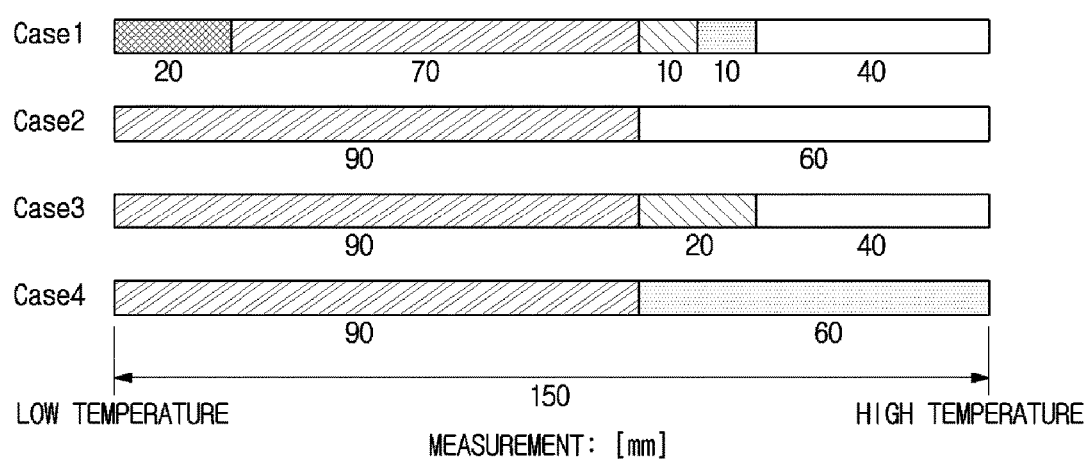
FIG. 13 is a view illustrating an example of a configuration of the magnetic band of the magnetic regenerator unit in accordance with an embodiment.

FIG. 12 is a graph illustrating the change of relative permeability according to a temperature of magnetocaloric materials of the magnetic regenerator unit in accordance with one embodiment of the present disclosure, FIG. 13 is a view illustrating an example of a configuration of the magnetic band of the magnetic regenerator unit in accordance with one embodiment of the present disclosure, and FIG. 14 is a table of the density of an iron illustrated in FIG. 13.

The relative permeability (μr) of gadolinium (Gd), one of magnetocaloric materials may be calculated by using the toroidal coil. Sphere-shaped gadolinium (Gd) is used as magnetocaloric materials and the measured values by using an annular shape are illustrated in FIG. 12.

As illustrated in FIG. 12, the relative permeability (μr) of gadolinium (Gd) that is a magnetocaloric material is changed according to the temperature.

In FIGS. 12 to 14, a plurality of magnetic bands having different relative permeability (μr) to each other are arranged in a longitudinal direction of the magnetocaloric material having the temperature gradient so that the change of temperature of the magnetocaloric material may corresponded thereto.

In case 1, in the magnetic band in which the entire length of magnetocaloric material is 150 mm, 20 mm of a magnetic band, which is the relative permeability (μr) of 6.90 and the iron powder density (g/cm3) of 3.23 is disposed, 70 mm of another magnetic band, which is the relative permeability (μr) of 3.00 and the iron powder density (g/cm3) of 1.69 is disposed, 10 mm of another magnetic band, which is the relative permeability (μr) of 1.81 and the iron powder density (g/cm3) of 1.07 is disposed, 10 mm of another magnetic band, which is the relative permeability (μr) of 1.46 and the iron powder density (g/cm3) of 0.69 is disposed, and 40 mm of another magnetic band, which is the relative permeability (μr) of 1.25 and the iron powder density (g/cm3) of 0.50 is disposed so that the temperature change of the magnetocaloric material may be obtained.

In case 2, in the magnetic band in which the entire length of magnetocaloric material is 150 mm, 90 mm of a magnetic band, which is the relative permeability (μr) of 3.00 and the iron powder density (g/cm3) of 1.69 is disposed, and 60 mm of another magnetic band, which is the relative permeability (μr) of 1.25 and the iron powder density (g/cm3) of 0.50 is disposed so that the temperature change of the magnetocaloric material may be obtained.

In case 3, in the magnetic band in which the entire length of magnetocaloric material is 150 mm, 90 mm of a magnetic band, which is the relative permeability (μr) of 3.00 and the iron powder density (g/cm3) of 1.69 is disposed, and 20 mm of another magnetic band, which is the relative permeability (μr) of 1.81 and the iron powder density (g/cm3) of 1.07 is disposed, 20 mm of another magnetic band, which is the relative permeability (μr) of 1.81 and the iron powder density (g/cm3) of 1.07 is disposed, and 40 mm of another magnetic band, which is the relative permeability (μr) of 1.25 and the iron powder density (g/cm3) of 0.50 is disposed so that the temperature change of the magnetocaloric material may be obtained.

In case 4, in the magnetic band in which the entire length of magnetocaloric material is 150 mm, 90 mm of a magnetic band, which is the relative permeability (μr) of 3.00 and the iron powder density (g/cm3) of 1.69 is disposed, and 60 mm of another magnetic band, which is the relative permeability (μr) of 1.46 and the iron powder density (g/cm3) of 0.69 is disposed so that the temperature change of the magnetocaloric material may be obtained.

Therefore, by arranging a magnetic band having a different relative permeability (μr) corresponding to the feature of the magnetic cooling system 100, the corresponding temperature change may be obtained Next, a method of changing a size of torque by adjusting a thickness of the magnetic band 310 will be described with reference to FIGS. 15 to 18.

Figure 15:
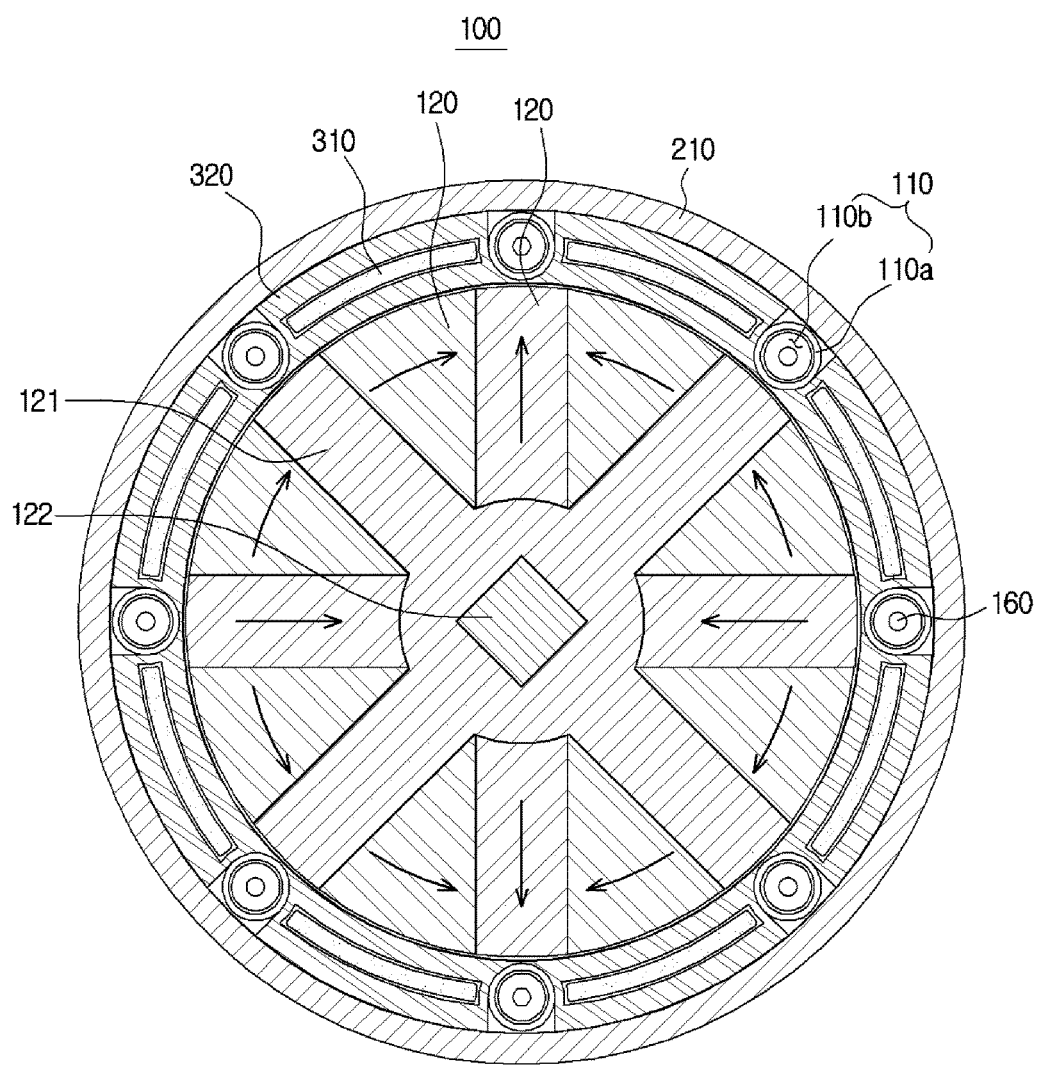
FIG. 15 is a plan view illustrating a magnetic regenerator unit in accordance with an embodiment.
Figure 16:
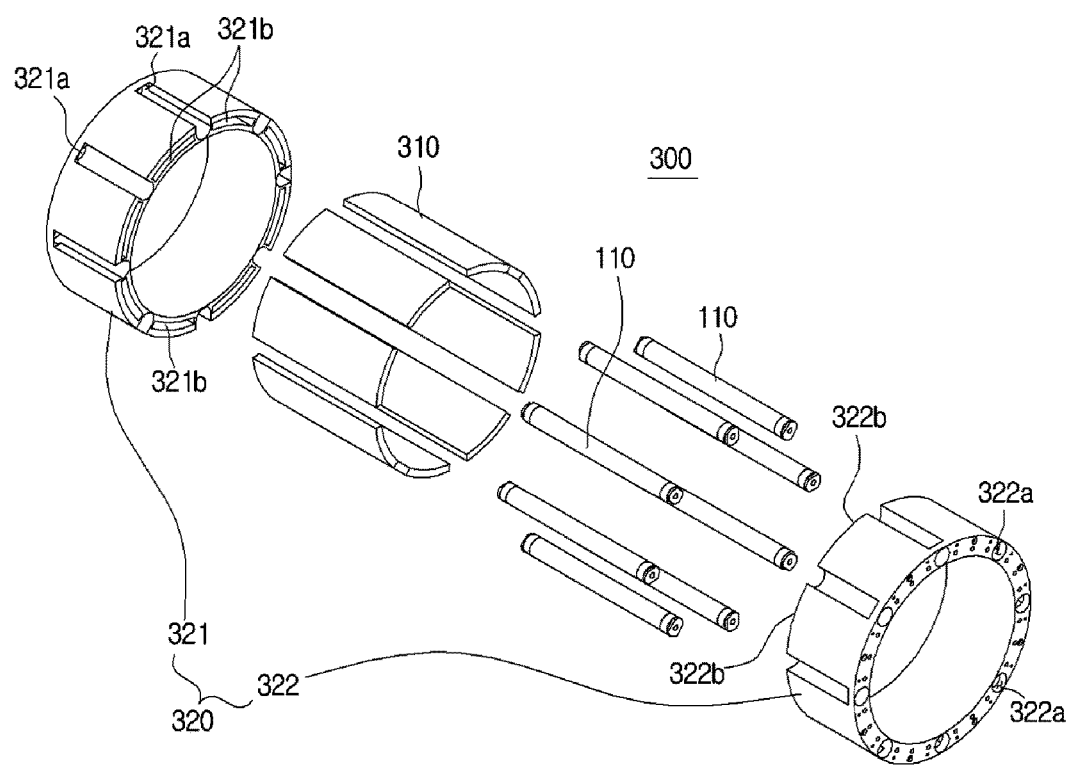
FIG. 16 is an exploded view illustrating a magnetic regenerator unit in accordance with an embodiment.
Figure 17:
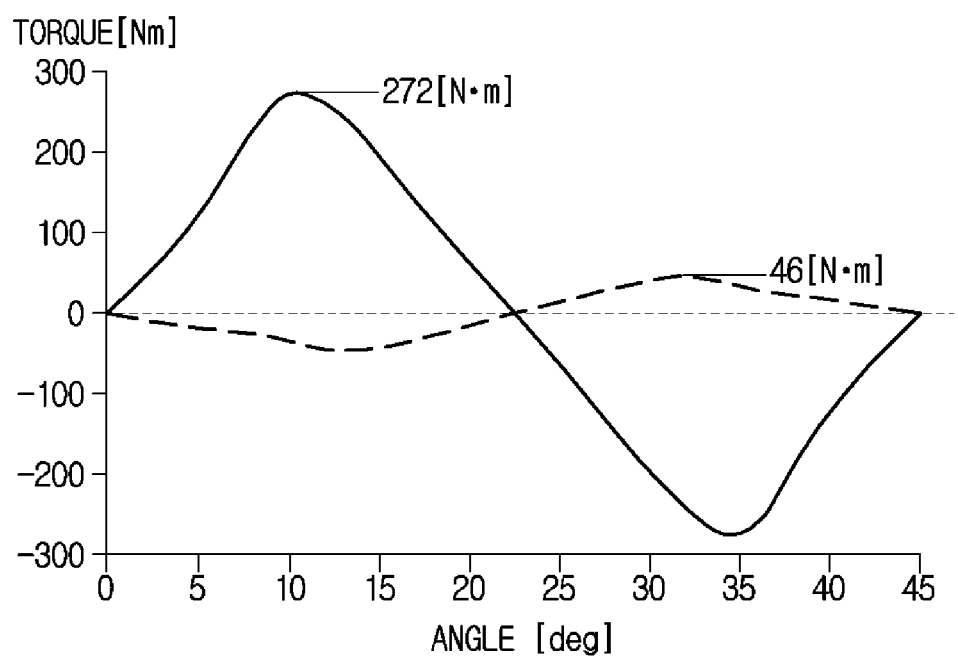
FIG. 17 is a graph illustrating a cogging torque of the magnetic regenerator unit in accordance with an embodiment.
Figure 18:
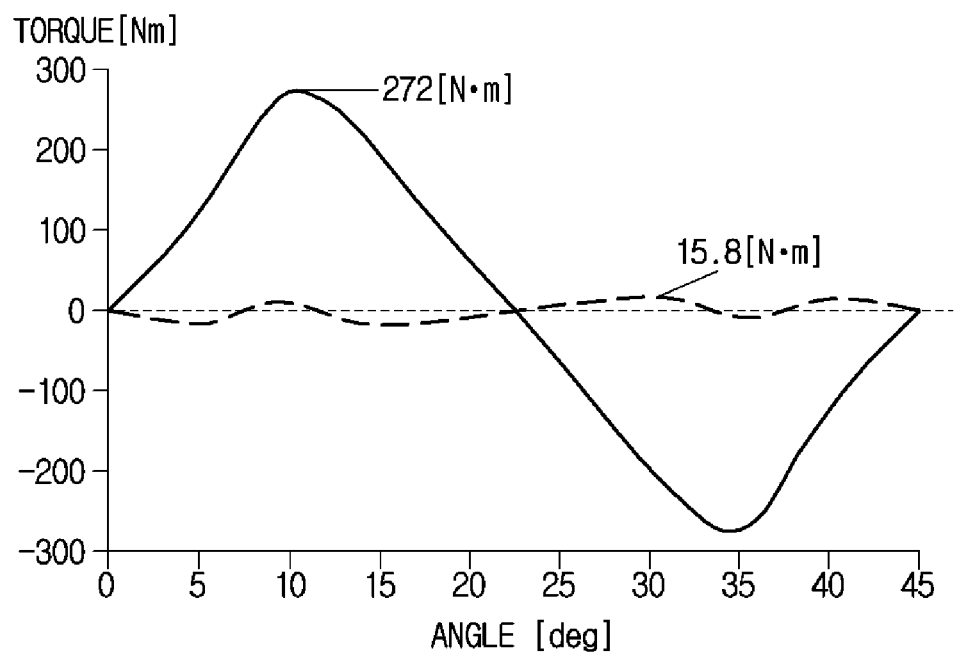
FIG. 18 is a graph illustrating a cogging torque of the magnetic regenerator unit in accordance with an embodiment.

FIG. 15 is a plan view illustrating a magnetic regenerator unit in accordance with another embodiment of the present disclosure, FIG. 16 is an exploded view illustrating a magnetic regenerator unit in accordance with another embodiment of the present disclosure, FIG. 17 is a graph illustrating a cogging torque of the magnetic regenerator unit in accordance with one embodiment of the present disclosure, and FIG. 18 is a graph illustrating a cogging torque of the magnetic regenerator unit in accordance with one embodiment of the present disclosure. In FIGS. 17 and 18, a solid line represents cogging torque when not applying the magnetic band 310, and a dotted line represents cogging torque when applying the magnetic band 310.

In FIGS. 15 and 16, a description of the same parts as those shown in FIGS. 6 and 7 will be omitted.

A magnetic regenerator unit 300, as illustrated in FIG. 15, includes a gap between a magnetic regenerator 110 and a magnetic band 310.

In FIGS. 15 and 16, cogging torque may be changed by changing a thickness of the magnetic band 310.

FIG. 17 is a graph (a dotted line) of cogging torque in a case that a thickness of the magnetic band 310 is 15.8 mm, which is assumed to be 100% of the thickness, and FIG. 18 is a graph (a dotted line) of cogging torque in a case that a thickness of the magnetic band 310 is 14.22 mm that is 90% of the thickness.

As illustrated in FIGS. 17 and 18, in comparison with cogging torque (46 Nm) in a case that a thickness of the magnetic band 310 is 15.8 mm that is 100% of the thickness, a cogging torque (15.8 Nm) in a case that a thickness of the magnetic band 310 is 14.22 mm that is 90% of the thickness is reduced. Therefore, the change of cogging torque may be obtained by adjusting a thickness of the magnetic band 310 according to the feature of the magnetic cooling system 100.

Next, a method of changing a size of torque by a magnetic band 310 having the same shape as a magnetic regenerator 110 will be described with reference to FIGS. 19 to 21.

Figure 19:
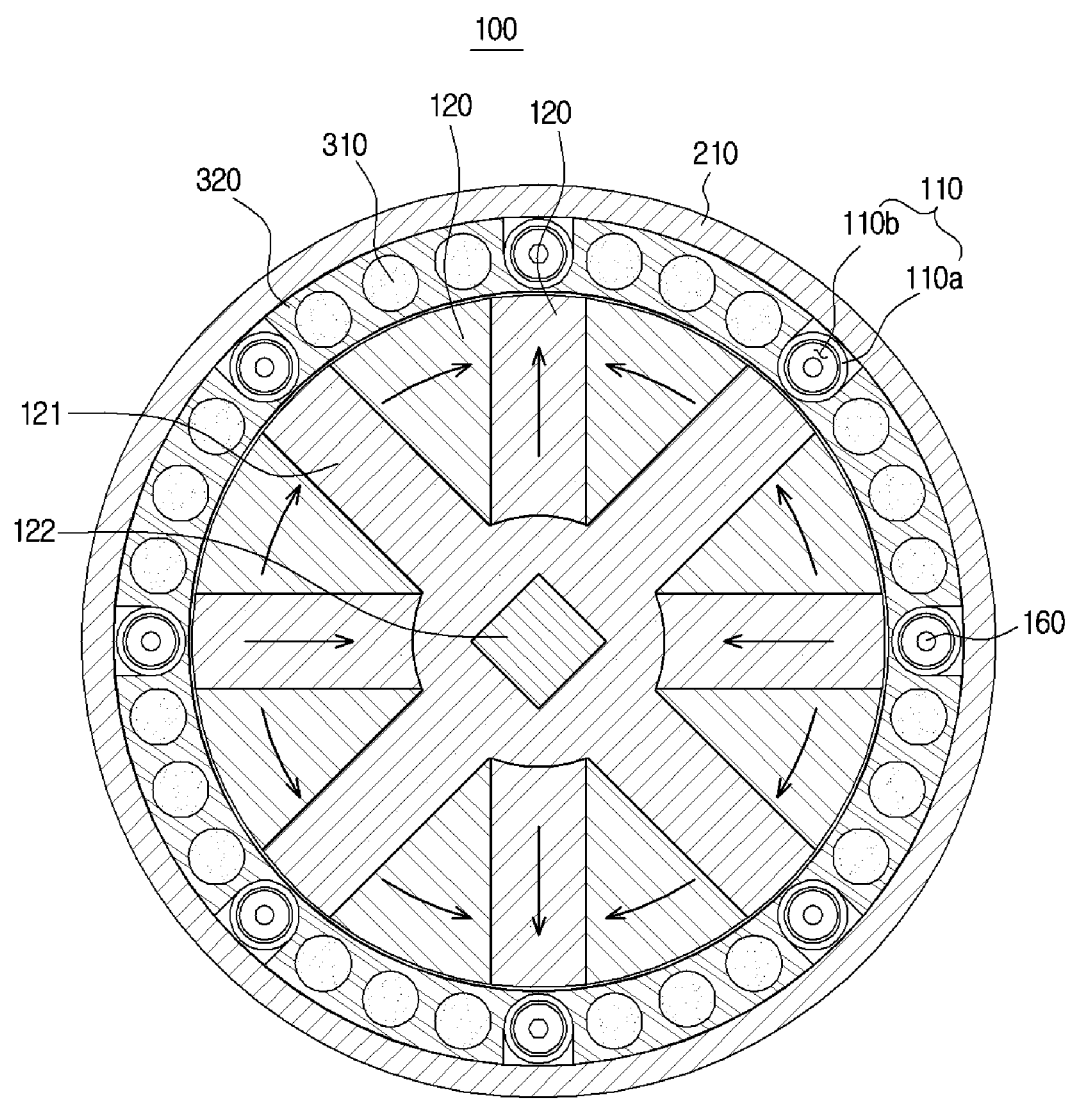
FIG. 19 is a plan view illustrating a magnetic regenerator unit in accordance with an embodiment.
Figure 20:
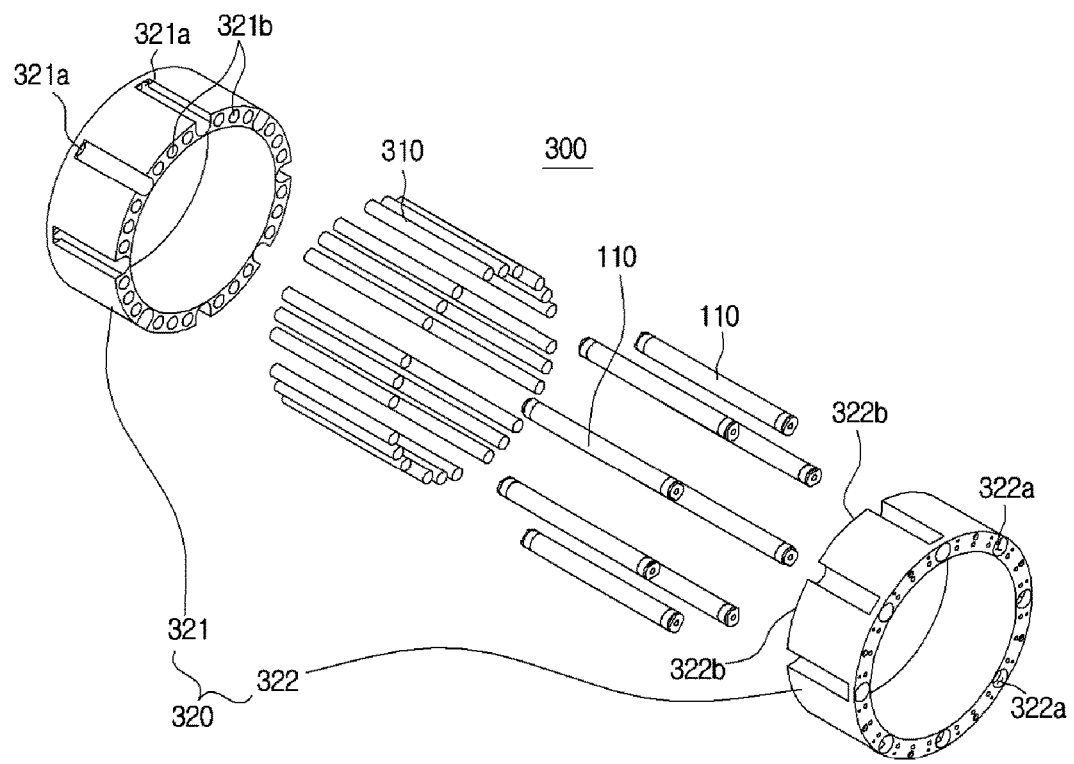
FIG. 20 is an exploded view illustrating a magnetic regenerator unit in accordance with an embodiment.
Figure 21:
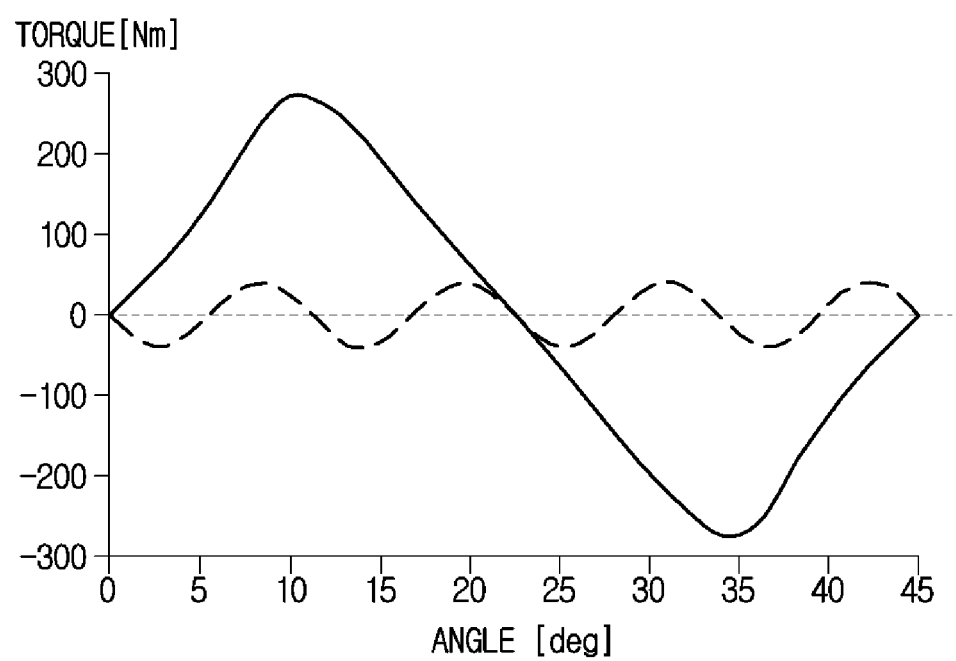
FIG. 21 is a graph illustrating a cogging torque of the magnetic regenerator unit in accordance with an embodiment.

FIG. 19 is a plan view illustrating a magnetic regenerator unit in accordance with another embodiment of the present disclosure, FIG. 20 is an exploded view illustrating a magnetic regenerator unit in accordance with another embodiment of the present disclosure, and FIG. 21 is a graph illustrating a cogging torque of the magnetic regenerator unit in accordance with one embodiment of the present disclosure.

In FIGS. 19 and 20, a description of the same parts as those shown in FIGS. 6 and 7 will be omitted.

A magnetic regenerator unit 300, as illustrated in FIG. 19, includes a gap between a magnetic regenerator 110 and a magnetic band 310.

In FIGS. 19 and 20, the shape of the magnetic band 310 is identical to that of the magnetic regenerator 110, and a plurality of magnetic bands 310 are disposed between the magnetic regenerators so that cogging torque may be reduced.

As the number of the magnetic bands 310 that are disposed between the magnetic regenerators 110 increases, the cogging torque may be further reduced.

As illustrated in FIG. 21, in a case that the shape of the magnetic band 310 is identical to that of the magnetic regenerator 110, the cogging torque is reduced substantially. Therefore, the change of the cogging torque may be obtained by adjusting a shape of the magnetic band 310 according to a feature of the magnetic cooling system 100.

In accordance with an embodiment of the present disclosure, a shape of the magnetic band 310 having the same as that of the magnetic regenerator 110 is described, but is not limited thereto. For example, the magnetic band 310 may be formed in a shape of an oval, or an angled shape, and may be disposed between the magnetic regenerators 110.

Next, a configuration in which a magnetic band 310 is disposed inside a magnetic regenerator 110 without a gap between the magnetic band 310 and the magnetic regenerator 110 will be described with reference to FIGS. 22 and 23.

Figure 22:
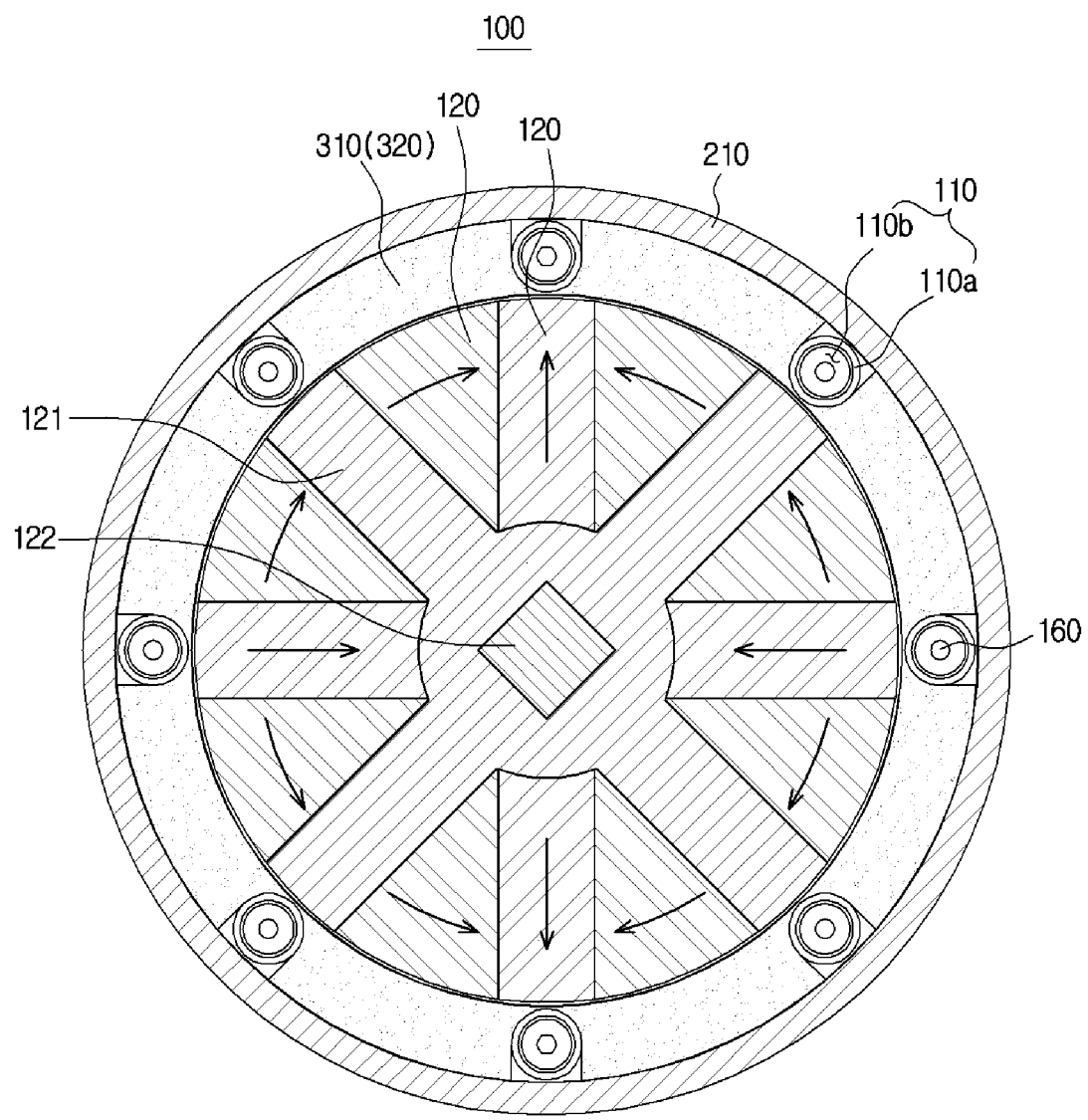
FIG. 22 is a plan view illustrating a magnetic regenerator unit in accordance with an embodiment.
Figure 23:
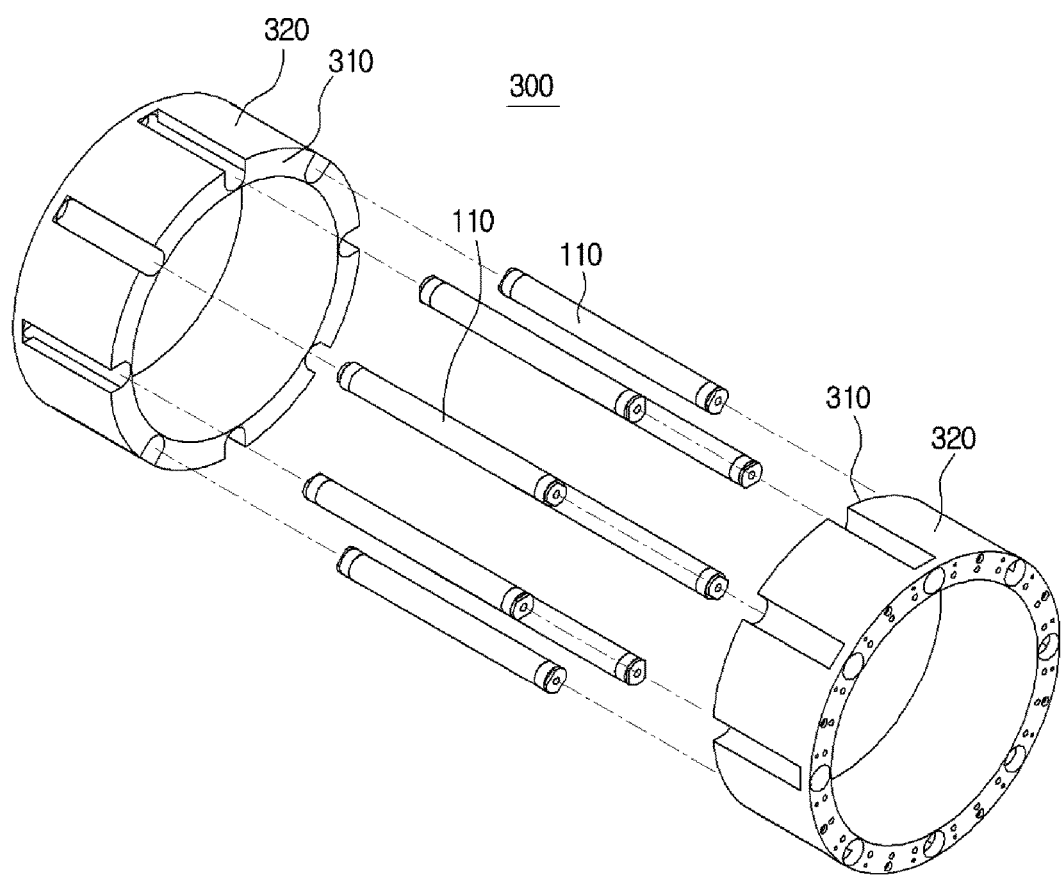
FIG. 23 is an exploded view illustrating a magnetic regenerator unit in accordance with an embodiment.

FIG. 22 is a plan view illustrating a magnetic regenerator unit in accordance with another embodiment of the present disclosure, and FIG. 23 is an exploded view illustrating a magnetic regenerator unit in accordance with another embodiment of the present disclosure.

In FIGS. 22 and 23, the magnetic band 310 is integrally formed with a container 320. Therefore, when the magnetic regenerator 110 is inserted into magnetic regenerator accommodation grooves 321a and 322a formed on the container 320, a configuration without a gap between the magnetic band 310 and the magnetic regenerator 110 will be achieved.

Alternatively, a method of rotating a permanent magnet 120 by disposing a coil 400 on a yoke 210, as a stator without using an external motor, will be described with reference to FIGS. 24 and 25.

Figure 24:
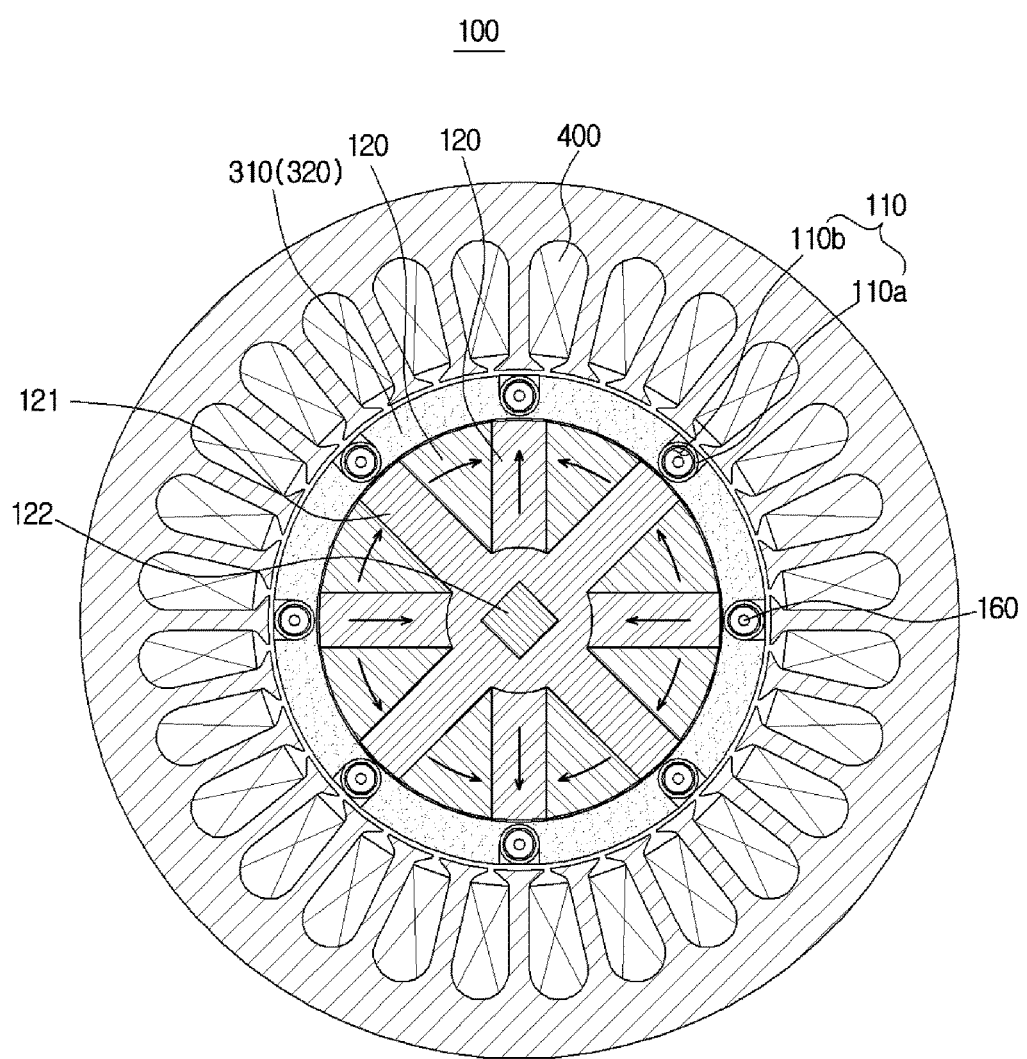
FIG. 24 is a plan view illustrating a magnetic regenerator unit in accordance with an embodiment.

FIG. 24 is a plan view illustrating a magnetic regenerator unit in accordance with another embodiment of the present disclosure, and FIG. 25 is a view illustrating cogging torque of the magnetic regenerator of FIG. 24.

In FIG. 24, when teeth and the coil 400 are disposed on the outside of the magnetic band 310, that is, the stator yoke 210, the current is applied so that the permanent magnet 120, as a rotator, may be rotated. With this structure, the magnetic regenerator 100 may be compact due to not using a separate external motor, and the rotator may be rotatable by using high flux density generated by the permanent magnet 120.

By receiving the current, the coil 400 generates a magnetic field that is changed according to the position of the permanent magnet 120. By interaction between the changeable magnetic field and the magnetic field generated by the flux generator 200, the permanent magnet 120 may be moved. That is, the coil 400 allows the magnetic regenerator 110 to enter or leave the magnetic field by alternating motion and rotary motion of the permanent magnet 120.

Alternatively, the coil 400 may allow the magnetic regenerator 110 to enter or leave the magnetic field by alternating motion and rotary motion of the magnetic regenerator 110.

In accordance with one embodiment of the present disclosure, a case of magnetic band 310 disposed on a rotary magnetic cooling system 100 is described as an example, but is not limited thereto. By a linear magnetic cooling system with the magnetic band, the same purpose and effect may be achieved as well.

As is apparent from the above description, according to the proposed magnetic regenerator unit and the magnetic cooling system having the same, by a circular magnetic regenerator structure capable of evenly flowing heat transfer fluid and magnetic field and the flow of the heat transfer fluid being changed in the same way, and a magnetic band having a relative permeability, similar to a relative permeability of the magnetic regenerator, high efficiency of a flux generator may be obtained while reducing torque of a rotator. Power consumption for driving may be reduced due to the reduction of the cogging torque, and the magnetic band may be manufactured at a low cost by using inexpensive iron powder.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A magnetic cooling system comprising:
    a flux generator to generate a magnetic field to obtain a magnetocaloric effect from magnetocaloric materials;
    a magnetic regenerator unit disposed in the magnetic field generated by the flux generator;
    a fluid supply apparatus to form a temperature gradient from the magnetocaloric effect; and
    a heat exchanger to exchange heat with the outside by using the temperature gradient;
    wherein the magnetic regenerator unit comprises a plurality of cylindrically shaped magnetic regenerators each formed at least partially of magnetocaloric materials, and a plurality of magnetic bands each formed in a shape of a curved panel, each of the magnetic bands having a relative permeability similar to a relative permeability of each of the magnetic regenerators, the magnetic bands being alternately disposed with the magnetic regenerators in a circumferential direction.

2. The magnetic cooling system of claim 1, wherein:
    each magnetic band is formed in a shape of a curved panel having a curvature identical to a curvature of a cylindrical surface of each magnetic regenerator.

3. The magnetic cooling system of claim 1, wherein:
    each magnetic band is formed of a compound material of magnetic material having a high relative permeability and a non-magnetic material.

4. The magnetic cooling system of claim 3, wherein:
    a relative permeability of each magnetic band is changed by mixing the magnetic material and the non-magnetic material after adjusting a volume ratio of the magnetic material and the non-magnetic material or adjusting a density ratio of a magnetic material per unit magnetic area.

5. The magnetic cooling system of claim 1, wherein:
    each magnetic band comprises a portion having one or more different relative permeabilities in a longitudinal direction of forming the temperature gradient.

6. The magnetic cooling system of claim 1, wherein:
    a thickness of each magnetic band differs from a thickness of each magnetic regenerator.

7. The magnetic cooling system of claim 1, further comprising:
    a container configured to receive the magnetic regenerators and the magnetic bands, wherein the container comprises a plurality of magnetic regenerator accommodation grooves in which the magnetic regenerators are inserted and fixed, and a plurality of magnetic band accommodation grooves in which the magnetic bands are inserted and fixed.

8. The magnetic cooling system of claim 7, wherein:
    the container is formed in a shape of a ring, and
    the magnetic regenerator accommodation grooves and the magnetic band accommodation grooves are alternately arranged in the circumferential direction.

9. The magnetic cooling system of claim 1, wherein:
    the flux generator comprises a yoke as a stator and a permanent magnet as a rotator.

10. The magnetic cooling system of claim 9, wherein:
    the yoke is formed in a shape of a hollow cylinder and made of silicon steel.

11. The magnetic cooling system of claim 9, wherein:
the magnetic regenerators and the magnetic bands are arranged between the yoke and the permanent magnet in the circumferential direction.

12. The magnetic cooling system of claim 9, further comprising:
a driving apparatus configured to rotate a rotator provided with the permanent magnet, wherein the driving apparatus comprises a motor installed on the outside of the magnetic cooling system.

13. The magnetic cooling system of claim 9, further comprising:
a driving apparatus configured to rotate the rotator, wherein the driving apparatus comprises teeth and a coil formed on the yoke.

14. The magnetic cooling system of claim 9, wherein the magnetic regenerator unit includes a gap between each magnetic regenerator and each magnetic band.

15. The magnetic cooling system of claim 9, wherein a shape of each magnetic regenerator is identical to a shape of each magnetic band to reduce cogging torque.

16. The magnetic cooling system of claim 9, wherein each magnetic band is formed in a shape of an oval.

17. The magnetic cooling system of claim 9, wherein each magnetic regenerator is formed in a shape of an oval.

* * * * *

UNITED STATES PATENT AND TRADEMARK OFFICE
CERTIFICATE OF CORRECTION

PATENT NO. : 10,030,895 B2
APPLICATION NO. : 14/642186
DATED : July 24, 2018
INVENTOR(S) : Jin Han Kim et al.

Page 1 of 1

It is certified that error appears in the above-identified patent and that said Letters Patent is hereby corrected as shown below:

On the Title Page

Item [73] (Assignees), Line 18 (Approx.):
Delete "UNIVERSTIY," and insert -- UNIVERSITY, --, therefore.

Signed and Sealed this
Second Day of October, 2018

Andrei Iancu
*Director of the United States Patent and Trademark Office*